(12) United States Patent
Blount et al.

(10) Patent No.: US 8,799,278 B2
(45) Date of Patent: Aug. 5, 2014

(54) DATA AUGMENTATION BASED ON SECOND-PHASE METADATA

(71) Applicants: Harry Blount, Hillsborough, CA (US); Travis Shanahan, Olathe, KS (US); James Clark, San Mateo, CA (US); Dana Guido, San Francisco, CA (US)

(72) Inventors: Harry Blount, Hillsborough, CA (US); Travis Shanahan, Olathe, KS (US); James Clark, San Mateo, CA (US); Dana Guido, San Francisco, CA (US)

(73) Assignee: Discern, Inc., San Francisco, CA (US)

( * ) Notice: Subject to any disclaimer, the term of this patent is extended or adjusted under 35 U.S.C. 154(b) by 0 days.

(21) Appl. No.: 13/632,829

(22) Filed: Oct. 1, 2012

(65) Prior Publication Data

US 2014/0095521 A1    Apr. 3, 2014

(51) Int. Cl.
*G06F 17/30*    (2006.01)

(52) U.S. Cl.
USPC ........... 707/726; 707/722; 707/731; 707/769; 707/804; 707/809

(58) Field of Classification Search
CPC ................................ G06F 17/30; G06F 17/00
See application file for complete search history.

(56) References Cited

U.S. PATENT DOCUMENTS

| | | | | |
|---|---|---|---|---|
| 3,574,461 A * | 4/1971 | Yurasek et al. | ............. | 356/5.05 |
| 3,636,324 A * | 1/1972 | Dommasch | ........................ | 701/3 |
| 4,016,871 A * | 4/1977 | Schiff | ............................ | 600/510 |
| 4,175,264 A * | 11/1979 | Schiff | ............................. | 345/24 |
| 4,285,037 A * | 8/1981 | Von Stetten | .................. | 710/316 |
| 4,313,036 A * | 1/1982 | Jabara et al. | .................. | 379/230 |
| 4,338,843 A * | 7/1982 | Wise | ............................... | 84/617 |
| 4,339,775 A * | 7/1982 | Lemke et al. | ................. | 386/200 |
| 4,375,683 A * | 3/1983 | Wensley | .......................... | 714/12 |
| 4,443,853 A * | 4/1984 | Maciolek et al. | ................. | 701/3 |
| 4,460,837 A * | 7/1984 | Anderson, Jr. | .................. | 327/68 |
| 4,488,220 A * | 12/1984 | Friedli et al. | .................... | 710/47 |
| 4,492,907 A * | 1/1985 | Fabian et al. | ................. | 318/586 |
| 4,510,602 A * | 4/1985 | Engdahl et al. | ............... | 714/725 |
| 4,594,680 A * | 6/1986 | Schomburg et al. | .......... | 708/654 |
| 4,598,697 A * | 7/1986 | Numazawa et al. | ............ | 600/17 |
| 4,605,950 A * | 8/1986 | Goldberg et al. | .......... | 348/389.1 |
| 4,788,656 A * | 11/1988 | Sternberger | .................... | 710/52 |
| 4,799,146 A * | 1/1989 | Chauvel | ........................ | 710/260 |
| 4,807,129 A * | 2/1989 | Perks | ................................ | 701/3 |
| 4,823,311 A * | 4/1989 | Hunter et al. | ................. | 708/144 |
| 4,835,607 A * | 5/1989 | Keith | ......................... | 348/390.1 |

(Continued)

OTHER PUBLICATIONS

Ivetic, Dragan, Mihic, Srdan, Markoski, Branko, "Augmented AVI video file for road surveying," Sep. 17, 2009, ElSevier, Computer and Electrical Engineering, vol. 36, pp. 169-179.*

(Continued)

*Primary Examiner* — Farhan Syed
(74) *Attorney, Agent, or Firm* — Schwegman, Lundberg & Woessner, P.A.

(57) ABSTRACT

A data augmentation machine may form all or part of a data augmentation system that is configured to augment data. The data augmentation machine may be configured (e.g., by one or more software modules) to access data (e.g., by crawling one or more public or private networks), extract metadata based on the data (e.g., from the data and its source), create a link to additional data (e.g., based on the extracted metadata), and augment the extracted metadata (e.g., by storing augmented metadata with the extracted metadata). Such augmented metadata may be presented (e.g., within a user interface), published publicly (e.g., on a webpage), published privately (e.g., in a report available only to premium subscribers of a data augmentation service), or any suitable combination thereof.

20 Claims, 11 Drawing Sheets

(56) References Cited

U.S. PATENT DOCUMENTS

| | | | | |
|---|---|---|---|---|
| 5,379,419 A * | 1/1995 | Heffernan et al. | | 1/1 |
| 5,481,718 A * | 1/1996 | Ryu et al. | | 719/316 |
| 5,493,677 A * | 2/1996 | Balogh et al. | | 382/305 |
| 5,497,491 A * | 3/1996 | Mitchell et al. | | 719/315 |
| 5,504,858 A * | 4/1996 | Ellis et al. | | 714/6.24 |
| 5,550,965 A * | 8/1996 | Gabbe et al. | | 715/209 |
| 5,579,516 A * | 11/1996 | Van Maren et al. | | 1/1 |
| 5,619,710 A * | 4/1997 | Travis et al. | | 709/203 |
| 5,640,555 A * | 6/1997 | Kleewein et al. | | 1/1 |
| 5,682,535 A * | 10/1997 | Knudsen | | 717/117 |
| 5,692,175 A * | 11/1997 | Davies et al. | | 1/1 |
| 5,721,903 A * | 2/1998 | Anand et al. | | 707/603 |
| 5,724,501 A * | 3/1998 | Dewey et al. | | 714/5.11 |
| 5,761,678 A * | 6/1998 | Bendert et al. | | 707/639 |
| 5,768,577 A * | 6/1998 | Kleewein et al. | | 1/1 |
| 5,774,643 A * | 6/1998 | Lubbers et al. | | 714/20 |
| 5,787,412 A * | 7/1998 | Bosch et al. | | 1/1 |
| 5,787,413 A * | 7/1998 | Kauffman et al. | | 1/1 |
| 5,826,001 A * | 10/1998 | Lubbers et al. | | 714/6.21 |
| 5,848,273 A * | 12/1998 | Fontana et al. | | 717/108 |
| 5,862,325 A * | 1/1999 | Reed et al. | | 709/201 |
| 5,870,746 A * | 2/1999 | Knutson et al. | | 1/1 |
| 5,874,955 A * | 2/1999 | Rogowitz et al. | | 345/589 |
| 5,890,167 A * | 3/1999 | Bridge et al. | | 1/1 |
| 5,901,171 A * | 5/1999 | Kohli et al. | | 375/147 |
| 6,021,410 A * | 2/2000 | Choy | | 719/328 |
| 6,101,064 A * | 8/2000 | Shepherd | | 360/77.08 |
| 8,176,440 B2 * | 5/2012 | Stading | | 715/853 |
| 8,468,244 B2 * | 6/2013 | Redlich et al. | | 709/225 |
| 2005/0216472 A1 * | 9/2005 | Leon et al. | | 707/10 |
| 2006/0123010 A1 * | 6/2006 | Landry et al. | | 707/10 |
| 2007/0100834 A1 * | 5/2007 | Landry et al. | | 707/10 |
| 2008/0243784 A1 * | 10/2008 | Stading | | 707/3 |
| 2008/0243787 A1 * | 10/2008 | Stading | | 707/3 |
| 2008/0263315 A1 | 10/2008 | Zhang et al. | | |
| 2009/0254572 A1 * | 10/2009 | Redlich et al. | | 707/10 |
| 2010/0250497 A1 * | 9/2010 | Redlich et al. | | 707/661 |
| 2011/0213651 A1 | 9/2011 | Milana et al. | | |
| 2011/0213661 A1 | 9/2011 | Milana et al. | | |
| 2011/0213681 A1 * | 9/2011 | Shahid | | 705/27.1 |
| 2011/0282731 A1 | 11/2011 | Guglielmi et al. | | |
| 2012/0221571 A1 * | 8/2012 | Orman | | 707/737 |

OTHER PUBLICATIONS

Bromley, Alex., et al., "Museum of London—Collections Information Integration Module," 2010, IEEE 4th International Conference on Semantic Computing, pp. 508-512.*

"Opera Solutions", [online]. (c) 2012 Opera Solutons, LLC. [retrieved on Dec. 10, 2012]. Retrieved from the Internet: <URL: http://www.operasolutions.com/>, (2012), 1 pg.

"Opera Solutions—BIQtm Exploratory Analytics", [online]. (c) 2012 Opera Solutions, LCC. [retrieved on Jul. 12, 2012]. Retrieved from the Internet: <URL: http://www.operasolutions.com/solutions/biq-exploratory-analytics .php>, (2012), 2 pgs.

"Opera Solutions—Delivery: The Insight Bureau", [online]. (c) 2012 Opera Solutions, LCC. [retrieved on Jul. 12, 2012]. Retrieved from the Internet: <URL: http://www.operasolutions.com/science-technology/delivery.php>, (2012), 1 pg.

"Opera Solutions—Enterprise Solutions", [online]. (c) 2012 Opera Solutions, LCC. [retrieved on Jul. 12, 2012]. Retrieved from the Internet: <URL: http://www.operasolutions.com/solutions/premium-solutions.php>, (2012), 2 pgs.

"Opera Solutions—Mobiuss tm Portfolio Valuation and Risk", [online]. (c) 2012 Opera Solutions, LCC. [retrieved on Jul. 12, 2012]. Retrieved from the Internet: <URL: http://www.operasolutions.com/solutions/mobiuss-portfolio-valuation-risk .php>, (2012), 2 pgs.

"Opera Solutions—The Vektor tm Platform", [online]. (c) 2012 Opera Solutions, LCC. [retrieved on Jul. 12, 2012]. Retrieved from the Internet: <URL: http://www.operasolutions.com/science-technology/the-vektor-platform.php>, (2012), 1 pg.

"Opera Solutions—Vertical Solutions", [online]. (c) 2012 Opera Solutions, LCC. [retrieved on Jul. 12, 2012]. Retrieved from the Internet: <URL: http://www.operasolutions.com/solutions/vertical-solutions.php>, (2012), 1 pg.

"International Application Serial No. PCT/US2013/058039, International Search Report mailed Oct. 4, 2013", 4 pgs.

"International Application Serial No. PCT/US2013/058039, Written Opinion mailed Oct. 4, 2013", 7 pgs.

* cited by examiner

DATA AUGMENTATION BASED ON SECOND-PHASE METADATA

TECHNICAL FIELD

The subject matter disclosed herein generally relates to the processing of data. Specifically, the present disclosure addresses systems and methods of data augmentation.

BACKGROUND

A network-based system may provide information to one or more of its users. Such a network-based system may include one or more servers (e.g., server machines) and one or more databases (e.g., database machines) configured to provide an information service to one or more users. Examples of network-based systems include financial information systems (e.g., MorningStar®), as well as commerce systems (e.g., shopping websites), publication systems (e.g., classified advertisement websites), listing systems (e.g., wish list websites or gift registries), transaction systems (e.g., payment websites), and social network systems (e.g., Facebook® or Twitter®).

An information service may be implemented in the example form of a financial information service that that provides financial information from a network-based financial information system to a user (e.g., via a device of the user). For example, a server machine within the financial information system may monitor a news feed for news articles that mention a company in which the user has invested, and the server machine may alert the user upon detection of a newly published news article that mentions the company. The server machine may even present the news article alongside marketplace information (e.g., a stock quote) related to the user's investment in the company.

BRIEF DESCRIPTION OF THE DRAWINGS

Some embodiments are illustrated by way of example and not limitation in the figures of the accompanying drawings.

DETAILED DESCRIPTION

Figure 1:
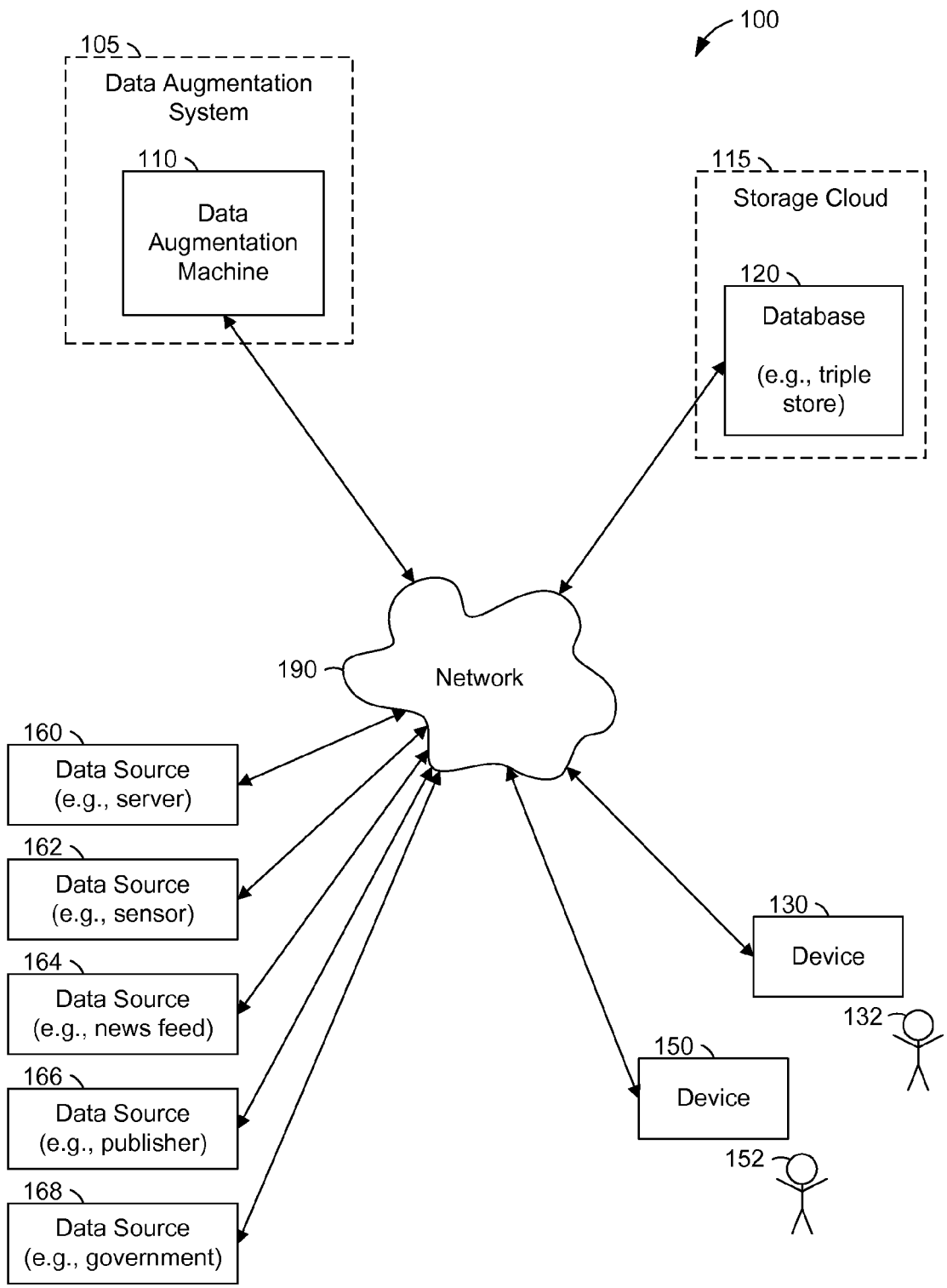
FIG. 1 is a network diagram illustrating a network environment suitable for data augmentation, according to some example embodiments.

Example methods and systems are directed to data augmentation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A data augmentation machine may form all or part of a data augmentation system that is configured to augment data. The data augmentation machine may be configured (e.g., by one or more software modules) to access data (e.g., by crawling one or more public or private networks), extract metadata based on the data (e.g., from the data and its source), create a link to additional data (e.g., based on the extracted metadata), and augment the extracted metadata (e.g., by storing augmented metadata with the extracted metadata). Such augmented metadata may be presented (e.g., within a user interface), published publicly (e.g., on a webpage), published privately (e.g., in a report available only to premium subscribers of a data augmentation service), or any suitable combination thereof.

For example, the data augmentation machine may target a data source by discovering its location (e.g., while crawling the Internet, receiving the location from a user, or receiving the location from a third-party server) and creating a profile for the data source. The data augmentation machine may extract metadata from the data source and its data (e.g., data contained therein or provided therefrom). The extracted metadata may be stored in a format that is globally common to all data types supported by the data augmentation machine. The data augmentation machine may then apply a processing operation herein called a "template" to the extracted metadata (e.g., access and apply a glossary, a thesaurus, a natural language programming (NLP) algorithm, or any suitable combination thereof) and create a link to other (e.g., additional) data. This other data and its corresponding metadata may be accessed via the created link by the data augmentation machine, which may generate (e.g., determine or infer) augmented metadata and store the augmented metadata, the created link, and the extracted metadata with the original data accessed from the discovered data source.

According to various example embodiments, the data augmentation machine may generate a user interface based on the augmented metadata. The generated user interface may be presented to a user of the data augmentation machine, via a device the user. The data augmentation machine may generate an alert based on the augmented metadata, and this alert may be provided to the user, via the user's device. In some example embodiments, the data augmentation machine generates a model investment portfolio and a valuation chart for the model investment portfolio, based on the augmented metadata, and provides the valuation chart to the user. In certain example embodiments, the data augmentation machine accesses the user's actual investment portfolio, generates a valuation chart of the user's actual investment portfolio, and displays the valuation chart for the user's portfolio. In hybrid example embodiments, the data augmentation machine presents the user with a comparison between valuation charts for a model investment portfolio and for the user's actual investment portfolio. Moreover, the data augmentation machine may provide investment suggestion based on the generated model investment portfolio. In various example embodiments, the data augmentation machine proceeds to adjust the user's actual investment portfolio based on the model investment portfolio generated based on the augmented metadata. Additional features according to various example embodiments are described below.

FIG. 1 is a network diagram illustrating a network environment 100 suitable for data augmentation, according to some example embodiments. The network environment 100 includes a data augmentation machine 110, a database 120, data sources 160, 162, 164, 166, and 168, and devices 130 and 150, all communicatively coupled to each other via a network 190. In some example embodiments, the data sources 160-168 are connected to the data augmentation machine 110 by the network 190, while the devices 130 and 150 are connected to the data augmentation machine 110 by a different network. The data augmentation machine 110, the database 120, and the devices 130 and 150 may each be implemented in a computer system, in whole or in part, as described below with respect to FIG. 10.

The data augmentation machine 110 may form all or part of a data augmentation system 105. The data augmentation system 105 may be included in a network-based information system. For example, the data augmentation system 105 may form all or part of a financial information system that provides a financial information service.

The database 120 is shown in FIG. 1 in the example form of a triple store. The database 120 may form all or part of a storage cloud 115 that is configured to provide fault-tolerant data storage for the data augmentation machine 110. For example, the storage cloud 115 may form all or part of a network-based (e.g., cloud-based) array of data centers that provide a data storage service for the data augmentation machine 110.

Each of the data sources 160-168 is an example of a locatable (e.g., addressable) source of data. As examples, one or more of the data sources 160-168 may be a server (e.g., a server machine, such as a web server that hosts a webpage), a sensor (e.g., a scientific instrument configured to measure one or more physical phenomena and transmit data based on such measurements), a news feed (e.g., a data stream provided by a news server), a publisher (e.g., an entity that publishes information accessible by the network 190), a governmental body (e.g., a department or office of the government that provides information accessible by the network 190), or any suitable combination thereof.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, data sources, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
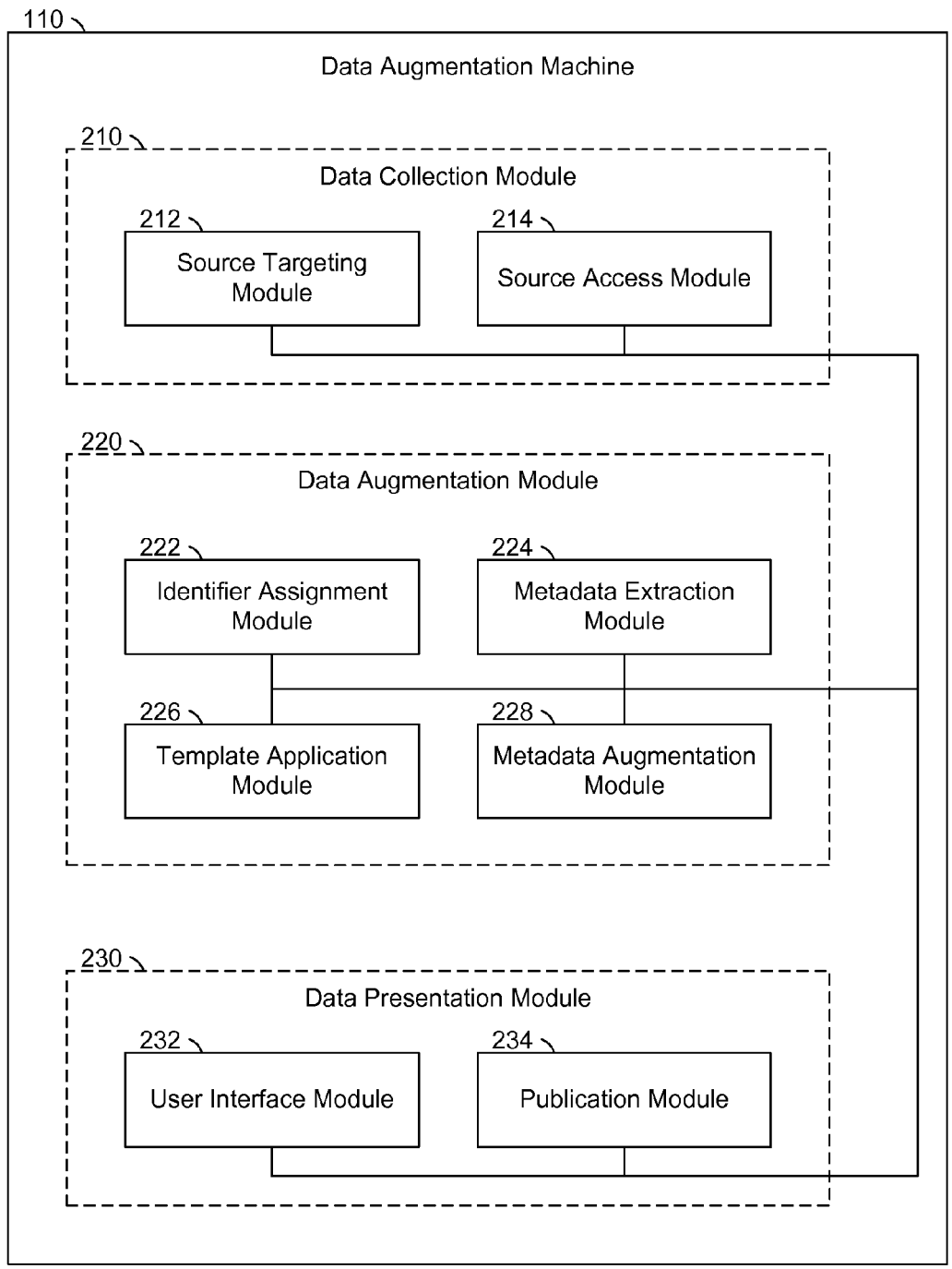
FIG. 2 is a block diagram illustrating components of the data augmentation machine, according to some example embodiments.

FIG. 2 is a block diagram illustrating components of the data augmentation machine 110, according to some example embodiments. The data augmentation machine 110 is shown as including, for example, a data collection module 210, a data augmentation module 220, and a data presentation module 230, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

The data collection module 210 may be configured to perform tasks pertinent to data collection, such as discovery or targeting of a data source (e.g., data source 160), access of the data source, retrieval of data from the data source, or any suitable combination thereof. The data collection module 210 is shown as including, for example, a source targeting module 212 and a source access module 214, which are configured to communicate with each other (e.g., via a bus, shared memory, or a switch).

The source targeting module 212 may be configured to target one or more data sources (e.g., data sources 160-168). For example, the source targeting module 212 may be configured to discover a location (e.g., a locater, such as a uniform resource locator (URL) or a network address) of the data source (e.g., by crawling the Internet or by initiating and monitoring a web crawler that crawls the Internet). As another example, the source targeting module 212 may be configured to receive a location of a data source from a user (e.g., from the user 132, via the device 130). As a further example, the source targeting module 212 may be configured to receive a location of a data source from a third-party server (e.g., a web server that provides a reference, such as a pointer, to the location of the data source).

In addition, the source targeting module 212 may be configured to store information regarding a data source (e.g., within the database 120). For example, the source targeting module 212 may be configured to create and store a profile for a data source (e.g., data source 160), and such a profile may contain a name of the data source, a description of the data source, the category of the data source, the location of the data source, an access policy (e.g., permissions), or any suitable combination thereof.

The source access module 214 may be configured to perform tasks pertinent to access of data from one or more sources (e.g., data sources 160-168), such as requesting data from a data source (e.g., data source 160), accessing the data, and receiving data from the data source. Examples of this data (e.g., "first data") that may be requested, accessed, and received from a data source include a document, a webpage, a report, a publication, an article, a news feed, a message, an email, a voicemail, video data (e.g., a video file or a video stream), an image, audio data (e.g., an audio file or an audio stream), a blog post (e.g., a micro-blog post), a forum comment, a server log, a data feed from a sensor (e.g., from the data source 162), and any suitable combination thereof.

The data augmentation module 220 may be configured to perform tasks pertinent to the data augmentation, such as assigning an identifier (e.g., a uniform resource identifier (URI)) to a data source, extracting metadata (e.g., "first-phase metadata") from the data source and its data (e.g., first data) received therefrom, formatting the extracted metadata, applying one or more templates (e.g., a processing operation based on a glossary, a thesaurus, an NLP algorithm, or any suitable combination thereof) to the formatted metadata, creating a link to other data (e.g., "second data"), augmenting the formatted metadata by determining additional metadata (e.g., "second-phase metadata") based on information accessed via the created link, or any suitable combination thereof. The data augmentation module 220 is shown as including, for example, an identifier assignment module 222, a metadata extraction module 224, a template application module 226, and a metadata augmentation module 228, which are configured to communicate with each other (e.g., via a bus, shared memory, or a switch).

The identifier assignment module 222 may be configured to assign an identifier (e.g., a URI) to a data source (e.g., data source 160) targeted or accessed by the data collection module 210. The assigned identifier of the data source may be stored by the identifier assignment module 222 in the database 120 (e.g., within a profile of the data source or within a data record that corresponds to the data source).

The metadata extraction module 224 may be configured to extract metadata from the data source (e.g., data source 160), from the data (e.g., first data) received therefrom by the data collection module 210, or from both. Examples of the extracted metadata (e.g., first phase metadata) include a data type, an author, a title, a creation date, a modification date, a creation timestamp, a modification timestamp, a summary, a category, a tag, or any suitable combination thereof, which may be extracted from the data (e.g., first data) received from the data source. Additional examples of the extracted metadata include a publisher, a provider, a last refresh date, a last refresh timestamp, a next refresh date, a next refresh time, an update frequency, an access policy (e.g., security permissions), or any suitable combination thereof, which may be extracted from the data source from which the data (e.g., first data) is received.

The metadata extraction module 224 may be further configured to format the extracted metadata (e.g., first-phase metadata) into a global metadata format that is common to all data types supported by the data augmentation machine 110. Such a global metadata format may form all or part of a data model or data framework that is implemented using a markup language (e.g., extensible markup language (XML)). A global metadata format may be a proprietary format, a standard-based format, or any suitable combination thereof.

The template application module 226 may be configured to apply one or more templates, which may also be called "pipes" herein, to the extracted and formatted metadata (e.g., first-phase metadata). Examples of such templates or pipes include a glossary, a thesaurus, a list of people's names (e.g., a list of names of persons, with nicknames, aliases, and alternate spellings, or a list of people associated with a particular subject or topic), a list of acronyms (e.g., a list of names of organizations or entities, with nicknames, aliases, and alternate spellings, or a list of organizations or entities associated with a particular subject or topic), and any suitable combination thereof. Such examples of templates may be implemented as a lookup table (e.g., a file that stores a lookup table), and the template application module 226 may apply such a template by accessing a template (e.g., the lookup table) and identifying (e.g., via a lookup operation) other data (e.g., second data) that may be pertinent to the data (e.g., first data) received from the data source (e.g., data source 160).

As noted above, another example of a template or a pipe is an NLP algorithm, and such an NLP algorithm may be applied (e.g., as a template) by the template application module 226 to the extracted and formatted metadata. For example, the template application module 226 may apply such a template by accessing and executing an NLP algorithm (e.g., stored as a set of instructions within the database 120), and execution of the NLP algorithm may result in the template application module 226 identifying other data (e.g., second data) that may be pertinent to the data (e.g., first data) received from the data source (e.g., data source 160).

The template application module 226 may further be configured to create a link to other data (e.g., second data), which may be pertinent to the data (e.g., first data) received from the data source (e.g., data source 160). This created link may be stored with the extracted and formatted metadata (e.g., in a profile or data record that corresponds to the data source), and the link may function as a reference (e.g., a pointer) to the other data. Accordingly, the created link may form all or part of a basis for accessing the other data, as well as metadata that describes the other data.

The metadata augmentation module 228 may be configured to access the data (e.g., second data) referenced by the created link. Moreover, the metadata augmentation module 228 may be configured to access metadata of the data referenced by the created link (e.g., metadata that describes the data referenced by the created link). The data referenced by the created link, along with its metadata, may form all or part of a basis for inferring augmented metadata (e.g., second-phase metadata) that corresponds to the data (e.g., first data) received from the data source (e.g., data source 160). Accordingly, the metadata augmentation module 228 may be configured to infer this augmented metadata (e.g., second-phase metadata) based on the data (e.g., second data) referenced by the created link, its corresponding metadata, or any suitable combination thereof, which may be accessed via the created link.

The data presentation module 230 may be configured to perform tasks pertinent to data presentation, such as generating a user interface to present data, publishing the data, or any suitable combination thereof. The data presentation module 230 is shown as including, for example, a user interface module 232 and a publication module 234, all configured to communicate with each other (e.g., via a bus, shared memory, or a switch).

The user interface module 232 may be configured to generate one or more user interfaces (e.g., graphical user interfaces) that may be operable by a user (e.g., user 132) to interact with information presented therein which information may be generated or presented based on the augmented metadata (e.g., second-phase metadata) determined (e.g., inferred) by the data augmentation module 220. Similarly, the publication module 234 may be configured to generate one or more communications (e.g., a publication, a document, a webpage, a report, an alert, a text message, an email, a phone call, a voicemail, or any suitable combination of) that may present information contained therein to a user (e.g., user 132), which information may be generated or presented based on the augmented metadata (e.g., second-phase metadata) determined by the data augmentation module 220.

According to various example embodiments, information generated or presented by the user interface module 232 may be similar to information generated or presented by the publication module 234. For example, such information may include a report that is generated based on the augmented metadata determined by the data augmentation module 220. As another example, such information may include an alert that is generated based on the augmented metadata. As yet another example, such information may include a model investment portfolio (e.g., generated based on the augmented metadata), a valuation chart for the model investment portfolio, an actual investment portfolio of a user (e.g., user 132), a valuation chart for the actual investment portfolio, an investment suggestion for the user, or any suitable combination thereof. As a further example, such information may include a graph of nodes (e.g., a pictorial depiction of interconnected nodes) that is generated based on one or more reports (e.g., reports generated based on the augmented metadata), one or more investment portfolios (e.g., model investment portfolios generated based on the augmented metadata), or any suitable combination thereof. Additional details and features of the various modules in the data augmentation machine 110 are described below.

Figure 3:
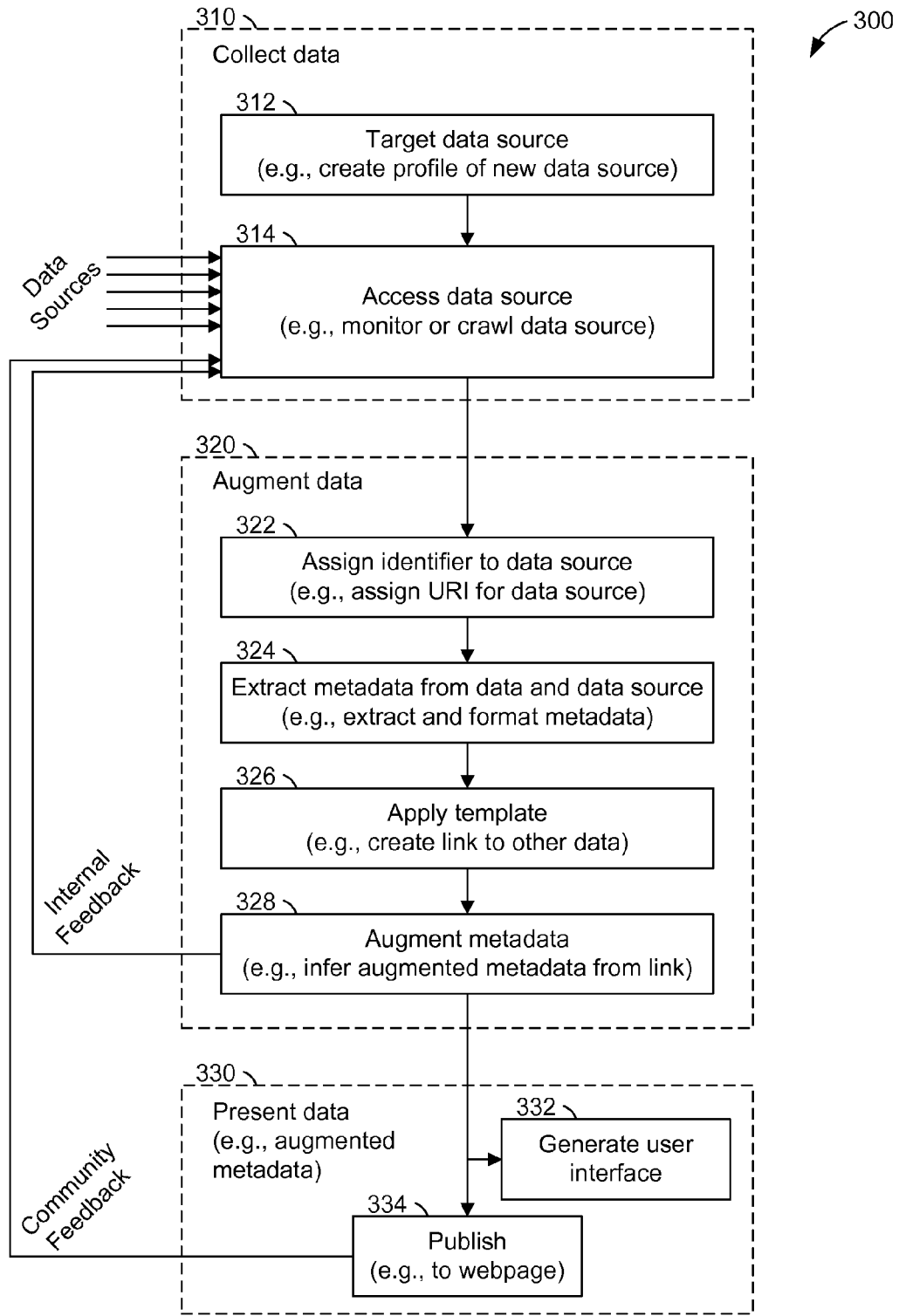
FIG. 3-9 are flowcharts illustrating operations of the data augmentation machine in performing a method of data augmentation, according to some example embodiments.

FIG. 3-9 are flowcharts illustrating operations of the data augmentation machine 110 in performing a method 300 of data augmentation, according to some example embodiments. Operations in the method 300 may be performed by the data augmentation machine 110, using modules described above with respect to FIG. 2. As shown in FIG. 3, the method 300 includes operations 310, 320, and 330.

In operation 310, the data collection module 210 collects data (e.g., first data) from a data source (e.g., data source 160). Operation 310 is shown as including, for example, operations 312 and 314. In operation 312, the source targeting module 212 targets the data source (e.g., by discovering the data source and creating a profile for the data source). In operation 314, the source access module 214 accesses the data source (e.g., by monitoring or "crawling" the data source in response to an event, a user request, or a schedule of periodically recurring accesses of the data source).

In operation 320, the data augmentation module 220 augments the data (e.g., first data) collected from the data source (e.g., data source 160). Operation 320 is shown as including, for example, operations 322, 324, 326, and 328. In operation 322, the identifier assignment module 222 assigns an identifier (e.g., a URI) to the data source. This may have the effect of enabling the data augmentation machine 110 to track the data source over time as the data (e.g., first data) is updated. In operation 324, the metadata extraction module 224 extracts metadata (e.g., first-phase metadata) from the data source, from the data that is accessible therefrom (e.g., first data), or from both. In some example embodiments, the metadata extraction module 224 formats the extracted metadata (e.g., using a global format, data model, or data framework) applicable to all types of data supported by the data augmentation machine 110. In operation 326, the template application module 226 processes the extracted metadata (e.g., first-phase metadata) by applying a template (e.g., a "pipe") to the extracted metadata. Moreover, the template application module 226 may create a link (e.g., a reference or a pointer) from the extracted metadata (e.g., first-phase metadata) to other data (e.g., second data) accessible by the data augmentation machine 110. In operation 328, the metadata augmentation module 228 determines augmented metadata (e.g., second-phase metadata) based on information accessible via the created link (e.g., the other data and its corresponding metadata).

In operation 330, the data presentation module 230 presents some or all of the augmented metadata (e.g., with the extracted metadata, the created link, the identifier of the data source, or any suitable combination thereof). Operation 330 is shown as including, for example, operations 332 and 334. In operation 332, the user interface module 232 generates a user interface that presents at least a portion of the augmented metadata. The user interface may enable a user (e.g., user 132) to interact with the presented portion of the augmented metadata. In operation 334, the publication module 234 publishes at least a portion of the augmented metadata. For example, the portion of the augmented metadata may be published in a webpage or other document for use by one or more users (e.g., users 132 and 152).

As shown in FIG. 3, the data source accessed in operation 314 (e.g., data source 160) may be selected from among several data sources available to the source access module 214. For example, any of the data sources 160-168 may be accessible to the source access module 214 in performance of operation 314. In addition, some example embodiments of the data augmentation machine 110 support an internal feedback path in which some or all of the augmented metadata determined in operation 328 is available for access by the source access module 214 (e.g., in a subsequent execution of the method 300). Similarly, some example embodiments of the data augmentation machine 110 support a community feedback path in which some or all of the augmented metadata published in operation 334 is available for access by the source access module 214 (e.g., in a subsequent execution of the method 300). For example, some or all of the augmented metadata may be indicated (e.g., marked) by one or more users (e.g., users 132 and 152) as being usable (e.g., sufficiently useful) as a data source, and based on such indications, the publication module 234 may provide the source access module 214 with some or all of the augmented metadata. The internal feedback path, the community feedback path, or both, may have the effect of enabling the data augmentation machine 110 to support machine-learning features that iteratively improve or enhance information stored in the database 120.

Figure 4:
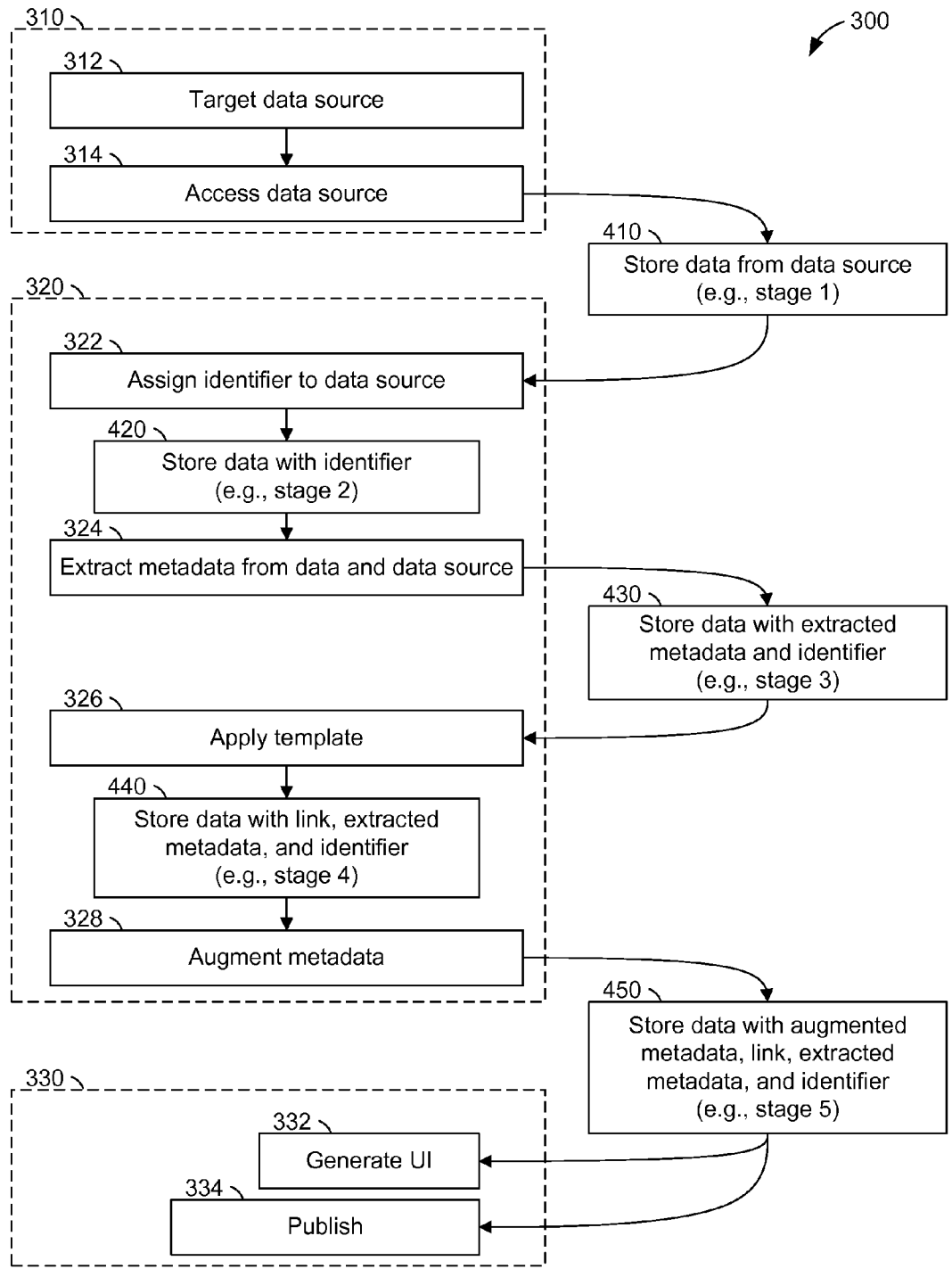

FIG. 4 illustrates storage operations that may be performed as part of the method 300, according to various example embodiments. As shown in FIG. 4, the method 300 may include one or more of operations 410, 420, 430, 440, and 450.

In operation 410, after the data source (e.g., data source 160) is accessed in operation 314, the source access module 214 may store the accessed data (e.g., first data) in the database 120. For example, the data accessed from the data source may be stored in the database 120 with a profile of the data source. In some example embodiments, operation 410 is deemed "Stage 1" with respect to data augmentation according to the method 300.

In operation 420, after the assignment of the identifier to the data source in operation 322, the identifier assignment module 222 may store the accessed data (e.g., first data) with the assigned identifier in the database 120. For example, the data accessed from the data source may be stored in the database 120, along with the profile of the data source and its assigned identifier. In some example embodiments, operation 420 is deemed "Stage 2" with respect to data augmentation according to the method 300.

In operation 430, after the extraction of the metadata (e.g., first-phase metadata) in operation 324, the metadata extraction module 224 may store the accessed data (e.g., first data) with the extracted metadata in the database 120. For example, the data accessed from the data source may be stored in the database 120 with the extracted metadata, along with the profile of the data source and its assigned identifier. In some example embodiments, operation 430 is deemed "Stage 3" with respect to data augmentation according to the method 300.

In operation 440, after the creation of a link to other data (e.g., second data) in operation 326, the template application module 226 may store the accessed data (e.g., first data) with the created link to the other data (e.g., a link to the second data) in the database 120. For example, the data accessed from the data source may be stored in the database 120 with the created link, along with the extracted metadata (e.g., first-phase metadata), the profile of the data source, and its assigned identifier. In some example embodiments, operation 440 is deemed "Stage 4" with respect to data augmentation according to the method 300.

In operation 450, after the determination of the augmented metadata (e.g., second-phase metadata) in operation 328, the metadata augmentation module 228 may store the accessed data (e.g., first data) with its augmented metadata (e.g., second-phase metadata) in the database 120. For example, the data accessed from the data source may be stored in the database 120 with the augmented metadata, along with the created link, the extracted metadata (e.g., first-phase metadata), the profile of the data source, and its assigned identifier. In some example embodiments, operation 450 is deemed "Stage 5" with respect to data augmentation according to the method 300.

Figure 5:
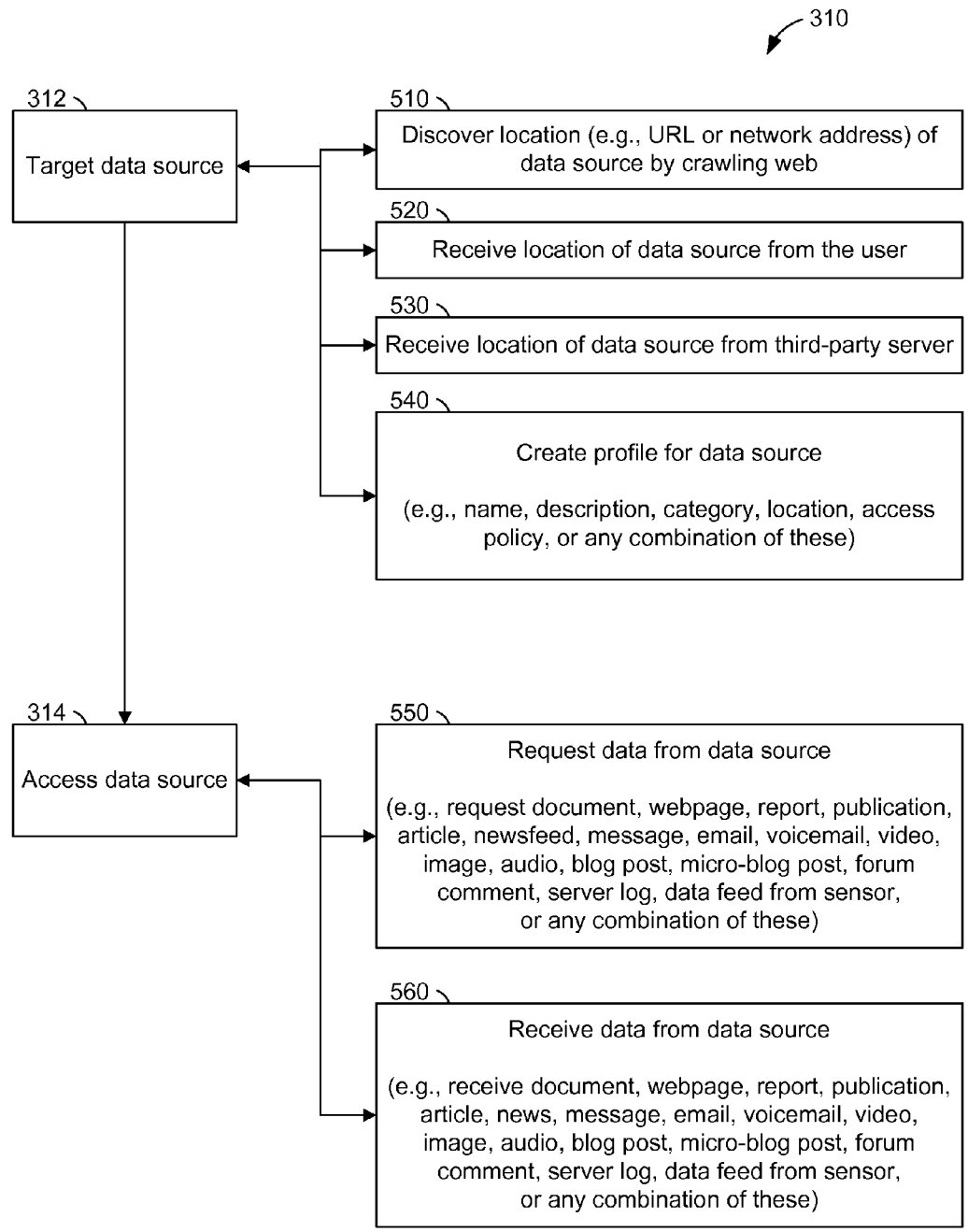

FIG. 5 illustrates further details of operation 310, in which the data collection module 210 collects the data (e.g., first data) accessible from the data source (e.g., data source 160). As shown in FIG. 5, one or more of operations 510, 520, 530, and 540 may be performed as part (e.g., a precursor task, a subroutine, or a portion) of operation 312, in which the source targeting module 212 targets the data source.

In operation 510, the source targeting module 212 discovers a location (e.g., a URL or a network address) of the data source. For example, the source targeting module 212 may crawl the Internet and thereby discover the location of the data source. As another example, the source targeting module 212 may initiate and monitor a separate web crawler application (e.g., provided by a third-party web crawling service) that discovers the location of the data source.

In operation 520, the source targeting module 212 receives the location of the data source from a user (e.g., user 132, via the device 130). For example, the source targeting module 212 may prompt the user to submit the location of the data source (e.g., as a data source of particular interest to the user or of particular pertinence to an investment portfolio of the user), and the source targeting module 212 may receive a response that identifies the location of the data source.

In operation 530, the source targeting module receives the location of the data source from a third-party server (e.g., via the network 190). For example, the source targeting module 212 may request to receive locations of data sources from the third-party server, and the third-party server may provide the location of the data source in response to this request. In some example embodiments, the source targeting module 212 requests information on data sources of particular interest or of particular pertinence to an investment portfolio (e.g., modeled or actual), and the source targeting module 212 receives the location of the data source from the third-party server in response.

In operation 540, the source targeting module 212 creates the profile for the data source (e.g., for the data source 160). The profile for the data source describes the data source, and as noted above, the profile for the data source may include a name of the data source, a description of the data source, the category of the data source, the location of the data source, an access policy (e.g., permissions), or any suitable combination thereof. The source targeting module 212 may store the created profile of the data source in the database 120.

As shown in FIG. 5, one or more of operations 550 and 560 may be performed as part of operation 314, in which the source access module 214 accesses the data source (e.g., data source 160) targeted by the source targeting module 212.

In operation 550, the source access module 214 requests data (e.g., the first data) from the data source (e.g., data source 160). As noted above, examples of this data (e.g., "the first data") that may be requested include a document, a webpage, a report, a publication, an article, a news feed, a message, an email, a voicemail, video data (e.g., a video file or a video stream), an image, audio data (e.g., an audio file or an audio stream), a blog post (e.g., a micro-blog post), a forum comment, a server log, a data feed from a sensor, and any suitable combination thereof.

In operation 560, the source access module 214 receives the data (e.g., the first data) requested in operation 550. For example, the source access module 214 may receive a document, a webpage, a report, a publication, an article, a news feed, a message, an email, a voicemail, video data, an image, audio data, a blog post (e.g., a micro-blog post), a forum comment, a server log, a data feed from a sensor, and any suitable combination thereof, as requested in operation 550.

Figure 6:
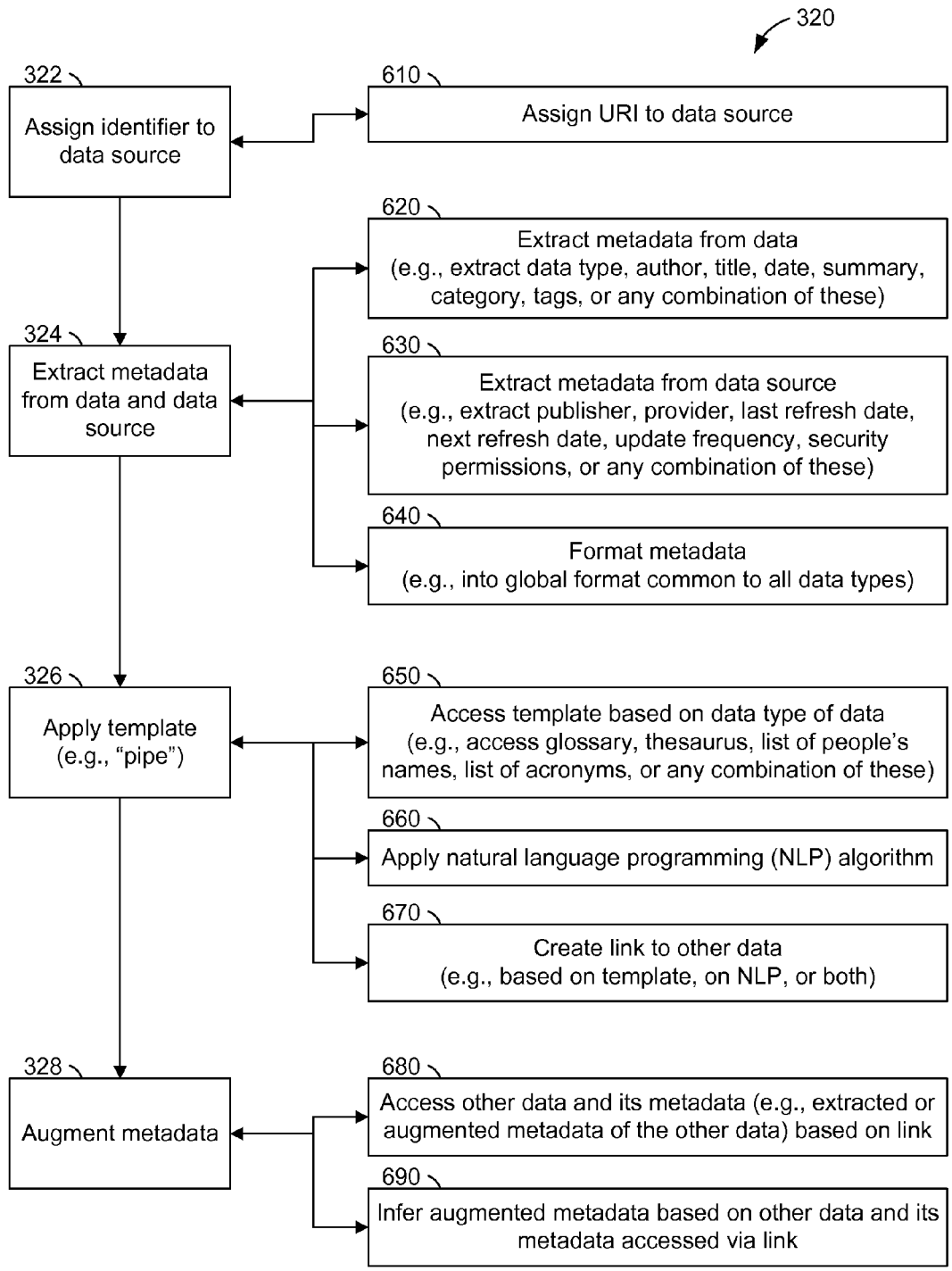

FIG. 6 illustrates further details of operation 320, in which the data augmentation module 220 augments the data (e.g., the first data) accessed from the data source (e.g., the data received in operation 560). As shown in FIG. 6, operation 610 may be performed as part of operation 322, in which the identifier assignment module 222 assigns the identifier to the data source (e.g., data source 160). In operation 610, the identifier assignment module 222 assigns a URI to the data source. In some example embodiments, the identifier assignment module 222 generates the URI and assigns it to the data source. In certain example embodiments, the identifier assignment module 222 performs a lookup operation (e.g., using the database 120) to determine the URI for assignment to the data source.

As shown in FIG. 6, one or more of operations 620, 630, and 640 may be performed as part of operation 324, in which the metadata extraction module 224 extracts the metadata (e.g., the first-phase metadata) from the data accessed from the data source (e.g., the first data), from the data source itself (e.g., data source 160), or any suitable combination thereof. In operation 620, the metadata extraction module 224 extracts at least some of the metadata from the data (e.g., the first data) accessed from the data source (e.g., as received in operation 560). Examples of such metadata include a data type, an author, a title, a creation date, a modification date, a creation timestamp, a modification timestamp, a summary, a category, a tag, or any suitable combination thereof.

In operation 630, the metadata extraction module 224 extracts at least some of the metadata from the data source (e.g., data source 160) of the data (e.g., the first data). Examples of such metadata include a publisher, a provider, a last refresh date, a last refresh timestamp, a next refresh date, a next refresh time, an update frequency, an access policy (e.g., security permissions), or any suitable combination thereof.

In operation 640, the metadata extraction module 224 formats the extracted metadata. In doing so, the metadata extraction module 224 may organize (e.g., reorganize) the extracted metadata according to a global template format, which may be shared in common by all data types that are supported by the data augmentation machine 110. This may have the effect of conforming the extracted metadata to a data model or data framework specified (e.g., defined) by the global template format. As noted above, the global template format may be proprietary (e.g., non-compliant with one or more industry standards), standards-based (e.g., compliant with one or more industry standards), or any suitable combination thereof.

As shown in FIG. 6, one or more of operations 650, 660, and 670 may be performed as part of operation 326, in which the template application module 226 applies a template to the extracted data and creates a link to other data (e.g., to the second data). In operation 650, the template application module 226 accesses a template that corresponds to a data type of the data (e.g., the first data) accessed from the data source (e.g., data source 160). Operation 650 may involve the template application module 226 determining the data type, based on the metadata extracted in operation 324, and using the data type to determine the proper template for the data (e.g., the first data) accessed from the data source. For example, the template application module 226 may access the template in the form of a glossary, a thesaurus, a list of people's names (e.g., a list of names of persons, with nicknames, aliases, and alternate spellings, or a list of people associated with a particular subject or topic), a list of acronyms (e.g., a list of names of organizations or entities, with nicknames, aliases, and alternate spellings, or a list of organizations or entities associated with a particular subject or topic), or any suitable combination thereof.

In operation 660, the template application module 226 applies an NLP algorithm to the extracted metadata. According to various example embodiments, the NLP algorithm is an example of a template (e.g., a "pipe") that may be applied to the extracted metadata to process the extracted metadata and form all or part of a basis for creating the link discussed above with respect to operation 326.

In operation 670, the template application module 226 creates the link discussed above with respect to operation 326. For example, the link may be a reference (e.g., a pointer, a hyperlink, or index) from the extracted metadata (e.g., the first-phase metadata) to other data (e.g., the second data) accessible by the data augmentation machine 110. In some example embodiments, the creating of the link includes identifying the other data (e.g., the second data) based on the template applied in operation 650, the NLP algorithm applied in operation 660, or both. As noted above, this link may be stored with the data (e.g., the first data) accessed from the data source (e.g., in the database 120).

As shown in FIG. 6, one or more of operations 680 and 690 may be performed as part of operation 328, in which the metadata augmentation module 228 determines the augmented metadata (e.g., the second-phase metadata) based on information accessible via the created link (e.g., the second data, its corresponding metadata, or both). In operation 680, the metadata augmentation module 228 accesses the information accessible via the link. For example, this information may include the data referenced by the link (e.g., the second data), its corresponding metadata (e.g., as provided by a data source of the data referenced by the link), or any suitable combination thereof. According to various example embodiments, the accessing of this information includes requesting it from a data source (e.g., data source 168) that corresponds to the link and receiving the requested information from that data source in response to the request.

In operation 690, the metadata augmentation module 228 determines (e.g., by inference) the augmented metadata based on the information accessed in operation 680. For example, the metadata augmentation module 228 may determine the augmented metadata (e.g., the second-phase metadata) based on the data referenced by the link (e.g., the second data), its corresponding metadata (e.g., as provided by a data source of the data referenced by the link), or any suitable combination thereof.

Accordingly, this may have the effect of inferring the augmented metadata (e.g., the second-phase metadata) as supplemental information that complements, enhances, or augments the extracted metadata (e.g., the first-phase metadata) for the data (e.g., the first data) accessed from the data source (e.g., data source 160). As noted above, the augmented metadata may be stored (e.g., in the database 120) with the data accessed from the data source, along with the created link, the extracted metadata, the profile of the data source, and the data source's assigned identifier. Thus, the data accessed from the data source (e.g., the first data) may be significantly and meaningfully augmented by the data augmentation machine 110.

Figure 7:
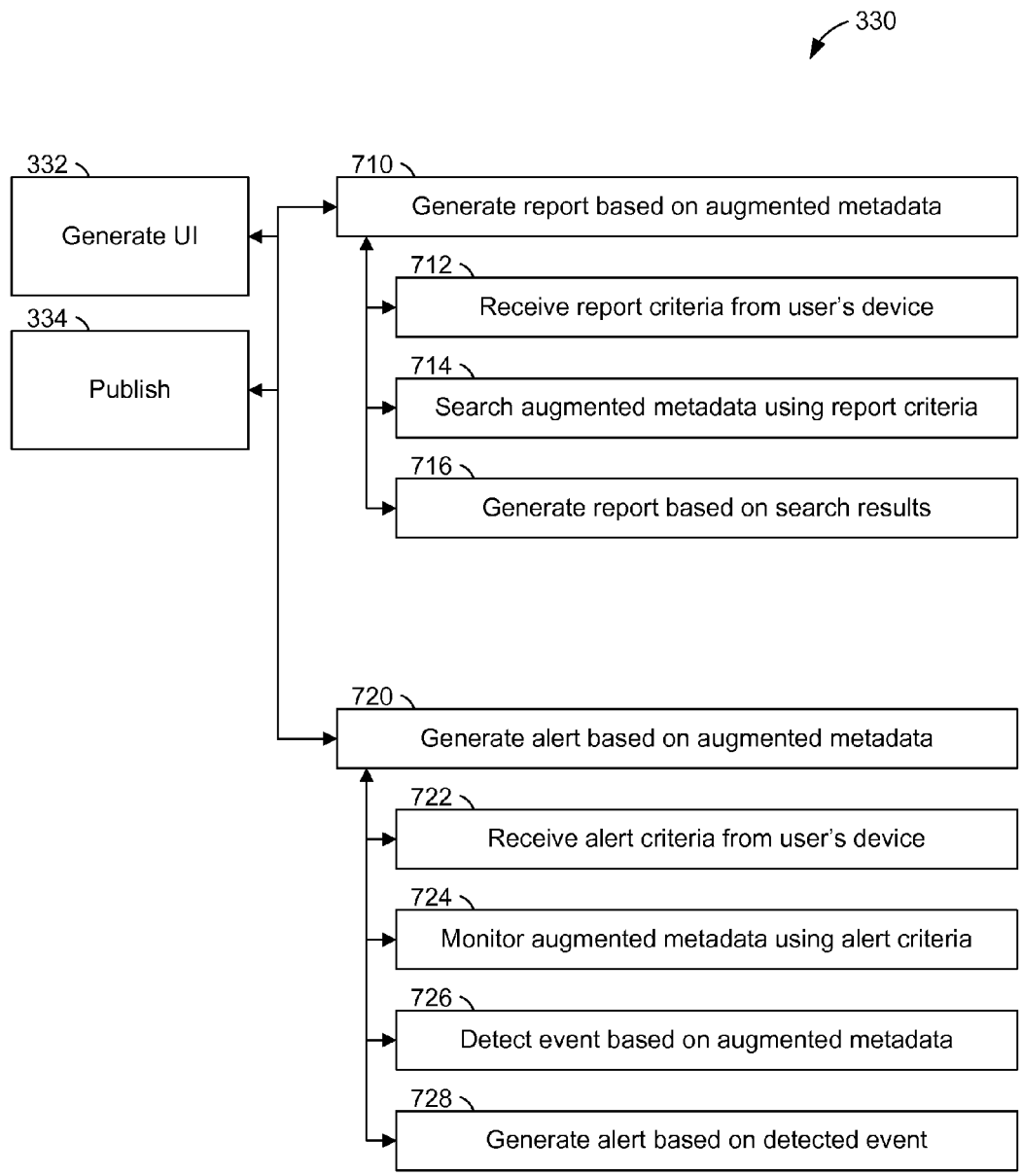

FIG. 7 illustrates some examples of information services that may be provided to the user (e.g., user 132) based on the augmented metadata (e.g., the second-phase metadata) determined by the data augmentation module 220. As shown in FIG. 7, operation 710 may be performed as part (e.g., a precursor task, a subroutine, or a portion) of operation 332 or operation 334. In operation 710, the data presentation module 230 (e.g., via the user interface module 232 or the publication module 234) generates a report based on the augmented metadata (e.g., the second-phase metadata). For example, the report may be a document or a message that includes some or all of the augmented metadata (e.g., for presentation to the user 132, via the device 130).

One or more of operations 712, 714, and 716 may be performed as part of operation 710. In operation 712, the data presentation module 230 (e.g., via the user interface module 232 or the publication module 234) receives one or more report criteria from a device (e.g., device 130) of the user (e.g., user 132). Examples of such report criteria include a keyword or key phrase that indicates a subject or topic of particular interest to the user or of particular pertinence to an investment portfolio of the user (e.g., a company name, an industry name, a brand name, a product name, or an ingredient of a product).

In operation 714, the data presentation module 230 (e.g., via the user interface module 232 or the publication module 234) searches the augmented metadata (e.g., the second-phase metadata) using the report criteria received in operation 712. For example, a search may be performed within the database 120, which may store augmented metadata determined for multiple data sources (e.g., data sources 160-168), and the search may identify the augmented metadata (e.g., the second-phase metadata) determined in operation 328 as a search result that corresponds to the report criteria received in operation 712. Accordingly, some or all of the data (e.g., the first data) accessed in operation 314, along with some or all of its corresponding extracted metadata (e.g., the first-phase metadata) or its augmented metadata (e.g., the second-phase metadata), may be usable or presentable as a search result in response to the report criteria received in operation 712.

In operation 716, the data presentation module 230 (e.g., via the user interface module 232 or the publication module 234) generates the report discussed above with respect to operation 710. For example, this report may be generated based on one or more of the search results discussed above with respect to 714, including the search result that identifies the augmented metadata (e.g., the second-phase metadata) determined in operation 328. Since the data (e.g., the first data) accessed in operation 314, its corresponding extracted metadata (e.g., the first-phase metadata), and its corresponding augmented metadata (e.g., the second-phase metadata) may be correlated (e.g., stored together) within the database 120, some or all of this cross-correlated information may be used by the data presentation module 230 in generating the report. In some example embodiments, the generated report is presented by the data presentation module 230 to the user (e.g., user 132, via the device 130).

As shown in FIG. 7, operation 720 may be performed as part of operation 332 or operation 334. In operation 720, the data presentation module 230 (e.g., via the user interface module 232 or the publication module 234) generates an alert based on the augmented metadata (e.g., the second-phase metadata). For example, the alert may be an email, text message, a phone call, a voicemail, a pop-up notification, or any suitable combination thereof, and the alert may include some or all of the augmented metadata (e.g., for presentation to the user 132, via the device 130).

One or more of operations 722, 724, 726, and 728 may be performed as part of operation 720. In operation 722, the data presentation module 230 (e.g., via the user interface module 232 or the publication module 234) receives one or more of alert criteria from a device (e.g., device 130) of the user (e.g., user 132). Examples of such alert criteria include a keyword or key phrase that indicates a subject or topic of particular interest to the user or of particular pertinence to an investment portfolio of the user. Additional examples of such alert criteria include a keyword or key phrase that indicates an event that serves as a trigger for sending an alert. According to various example embodiments, the event may be a future event that is predicted, expected, anticipated, or hypothesized by the user. In some example embodiments, the event may be likely to occur or unlikely to occur. In certain example embodiments, the event may be theoretically possible but practically improbable.

In operation 724, the data presentation module 230 (e.g., via the user interface module 232 or the publication module 234) monitors the augmented metadata (e.g., the second-phase metadata) based on the alert criteria received in operation 722. For example, the database 120 may store augmented metadata determined for multiple data sources (e.g., data sources 160-168), and this augmented metadata may be monitored (e.g., periodically or in real-time) for any augmented metadata that corresponds to the alert criteria (e.g., matches or near-matches the alert criteria). In some example embodiments, the database 120 is monitored to detect an event indicated by the alert criteria.

In operation 726, the data presentation module 230 (e.g., via the user interface module 232 or the publication module 234) detects an occurrence of an event indicated by some or all of the alert criteria received in operation 722. For example, performance of operation 450 may cause the data presentation module 230 to detect the event, based on the storage of the augmented metadata (e.g., the second-phase metadata) within the database 120.

In operation 728, the data presentation module 230 (e.g., via the user interface module 232 or the publication module 234) generates the alert discussed above with respect to operation 720. This alert may be generated based on the event detected in operation 726. In some example embodiments, the generated alert is communicated by the data presentation module 230 to the user (e.g., user 132, via the device 130).

Figure 8:
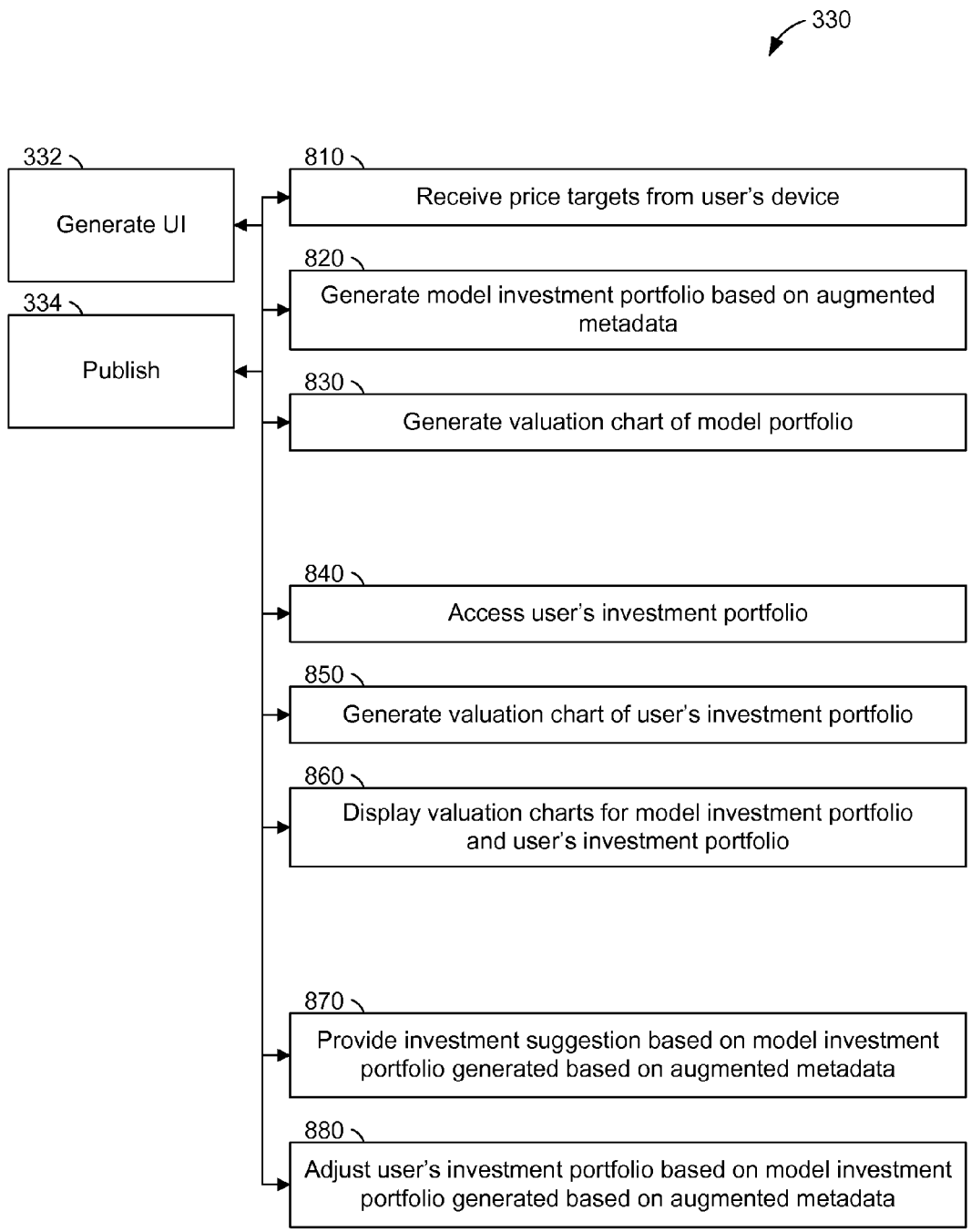

FIG. 8 illustrates some more examples of information services that may be provided to the user (e.g., user 132) based on the augmented metadata (e.g., the second-phase metadata) determined by the data augmentation module 220. As shown in FIG. 8, one or more of operations 810, 820, 830, 840, 850, 860, 870, and 880 may be performed as part of operation 332 or operation 334.

In operation 810, the data presentation module 230 (e.g., via the user interface module 232 or the publication module 234) receives one or more price targets from a device of the user (e.g., device 130 of the user 132). Examples of such price targets include a price or value of an investment or a unit of investment (e.g., a market price of a share of stock in a company or a market value of a government bond). A price target may represent a predicted, expected, anticipated, or hypothesized price for an investment or a unit thereof, as submitted by the user. According to various example embodiments, a price target may be received with information that identifies the investment or the unit thereof (e.g., a stock ticker symbol or a company name).

In operation 820, the data presentation module 230 (e.g., via the user interface module 232 or the publication module 234) generates a model investment portfolio based on the augmented metadata (e.g., the second-phase metadata) determined by the data augmentation module 220. Moreover, the model investment portfolio may be generated based on the one or more price targets received in operation 810, based on information that identifies one or more investments or units thereof, or any suitable combination thereof. For example, the data presentation module 230 may use a size of an investment (e.g., a user-submitted submitted number of stock shares or default presumed number of stock shares), in conjunction with one or more price targets and the augmented metadata (e.g., the second-phase metadata), to generate the model investment portfolio.

In operation 830, the data presentation module 230 (e.g., via the user interface module 232 or the publication module 234) generates a valuation chart for the model investment portfolio discussed above with respect to operation 820. For example, the data presentation module 230 may perform an analysis of an investment represented in the model investment portfolio, and this analysis may be based on the augmented metadata (e.g., the second-phase metadata) determined by the data augmentation module 220. One or more results of this analysis may be presented in the generated valuation chart for the model investment portfolio. In some example embodiments, the data presentation module 230 determines a current price of the investment, an outlook for the investment (e.g., an assessment of upside risks, downside risks, or both), a future price of the investment, or any suitable combination thereof (e.g., based on the information discussed above with respect to operations 800 and 820), for presentation in the generated valuation chart for the model investment portfolio.

In operation 840, the data presentation module 230 (e.g., via the user interface module 232 or the publication module 234) accesses an actual investment portfolio of the user (e.g., user 132). For example, the data presentation module 230 may access (e.g., from the database 120) user-submitted data that defines the user's actual investment portfolio. Accordingly, the data presentation module 230 may analyze the user's actual investment portfolio manner similar to that described above with respect to operation 830.

In operation 850, the data presentation module 230 (e.g., via the user interface module 232 or the publication module 234) generates a valuation chart for the actual investment portfolio of the user (e.g., user 132). For example, the data presentation module 230 may perform an analysis of an investment represented in the user's actual investment portfolio, and this analysis may be based on the augmented metadata (e.g., the second-phase metadata) determined by the data augmentation module 220. One or more results of this analysis may be presented in the generated valuation chart for the user's actual investment portfolio. In some example embodiments, the data presentation module 230 determines a current price of the investment, an outlook for the investment, a future price of the investment, or any suitable combination thereof, for presentation in the generated valuation chart for the user's actual investment portfolio.

In operation 860, the data presentation module 230 (e.g., via the user interface module 232 or the publication module 234) presents (e.g., displays) the valuation chart generated in operation 830, the valuation chart generated in operation 850, or both. These valuation charts may be presented to a device (e.g., device 130) of the user (e.g., user 132). According to various example embodiments, the presentation of these valuation charts allows the user to conveniently view a comparison of the model investment portfolio with the user's actual investment portfolio.

In operation 870, the data presentation module 230 (e.g., via the user interface module 232 or the publication module 234) generates and provides an investment suggestion to a device (e.g., device 130) of the user (e.g., user 132). This investment suggestion may be generated and provided based on the augmented metadata (e.g., second-phase metadata) determined by the data augmentation module 220. In particular, the investment suggestion may be generated and provided based on the model investment portfolio discussed above with respect to operation 820. As noted above, the model investment portfolio may be generated based on the augmented metadata (e.g., the second phase metadata) determined by the data augmentation module 220.

In certain example embodiments, the user (e.g., user 132) enables the data augmentation machine 110 to make investment decisions on behalf of the user (e.g., via a preference setting or other authorization). Accordingly, in operation 880, the data presentation module 230 (e.g., via the user interface module 232 or the publication module 234) takes an action based on the investment suggestion discussed above with respect to operation 870. For example, the data presentation module 230 may communicate the investment suggestion as an investment change order to a financial institution that manages the user's actual investment portfolio. Accordingly, some example embodiments of the data augmentation machine 110 perform operation 880 to adjust the user's actual investment portfolio based on the augmented metadata (e.g., second-phase metadata) determined by the data augmentation module 220. In particular, such an adjustment may be performed based on the model investment portfolio discussed above with respect to operation 820. As noted above, the model investment portfolio may be generated based on the augmented metadata (e.g., the second phase metadata) determined by the data augmentation module 220.

Figure 9:
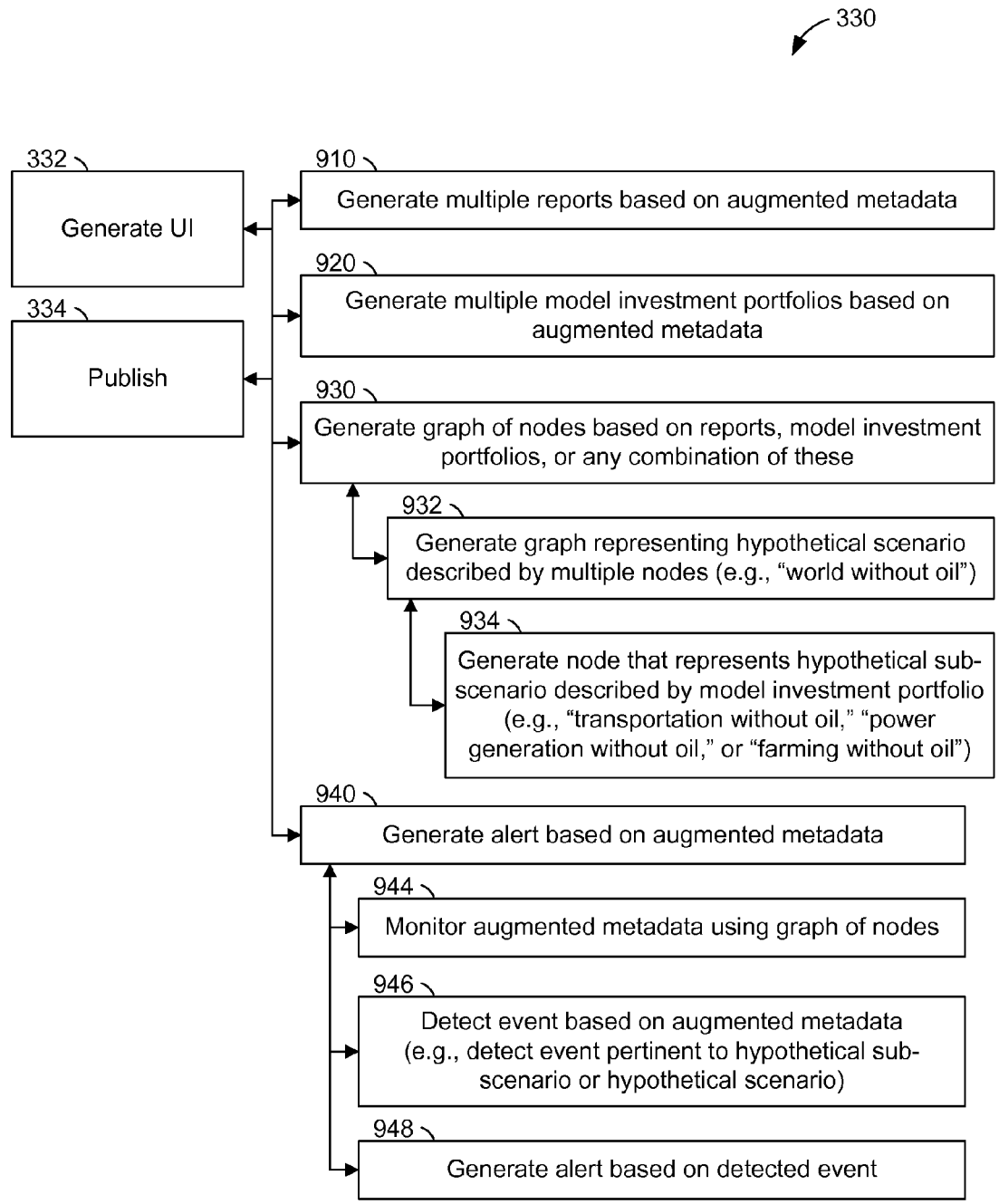

FIG. 9 illustrates some further examples of information services that may be provided to the user (e.g., user 132) based on the augmented metadata (e.g., the second-phase metadata) determined by the data augmentation module 220. As shown in FIG. 9, one or more of operations 910, 920, 930, and 940 may be performed as part of operation 332 or operation 334.

In operation 910, the data presentation module 230 (e.g., via the user interface module 232 or the publication module 234) generates multiple reports based on multiple instances of augmented metadata (e.g., including the augmented metadata determined for the data accessed in operation 314). Each of these multiple reports may be generated in a manner similar to that described above with respect to operation 710. In particular, these multiple reports may respectively describe multiple subjects or topics (e.g., multiple companies, organizations, or data sources) that are related together by a common scenario (e.g., a theme or a progression of events).

In operation 920, the data presentation module 230 (e.g., via the user interface module 232 or the publication module 234) generates multiple model investment portfolios based on multiple instances of augmented data (e.g., including the augmented data determined for the data accessed in operation 314). Each of these multiple model investment portfolios may be generated in a manner similar to that described above with respect to operation 820. Moreover, operation 920 may also include generation of multiple valuation charts for these multiple model investment portfolios, respectively, in a manner similar to that described above with respect to operation 830. In particular, these multiple model investment portfolios and their corresponding valuation charts may respectively describe multiple subjects or topics that are related together by the common scenario discussed above with respect to operation 910.

Figure 10:
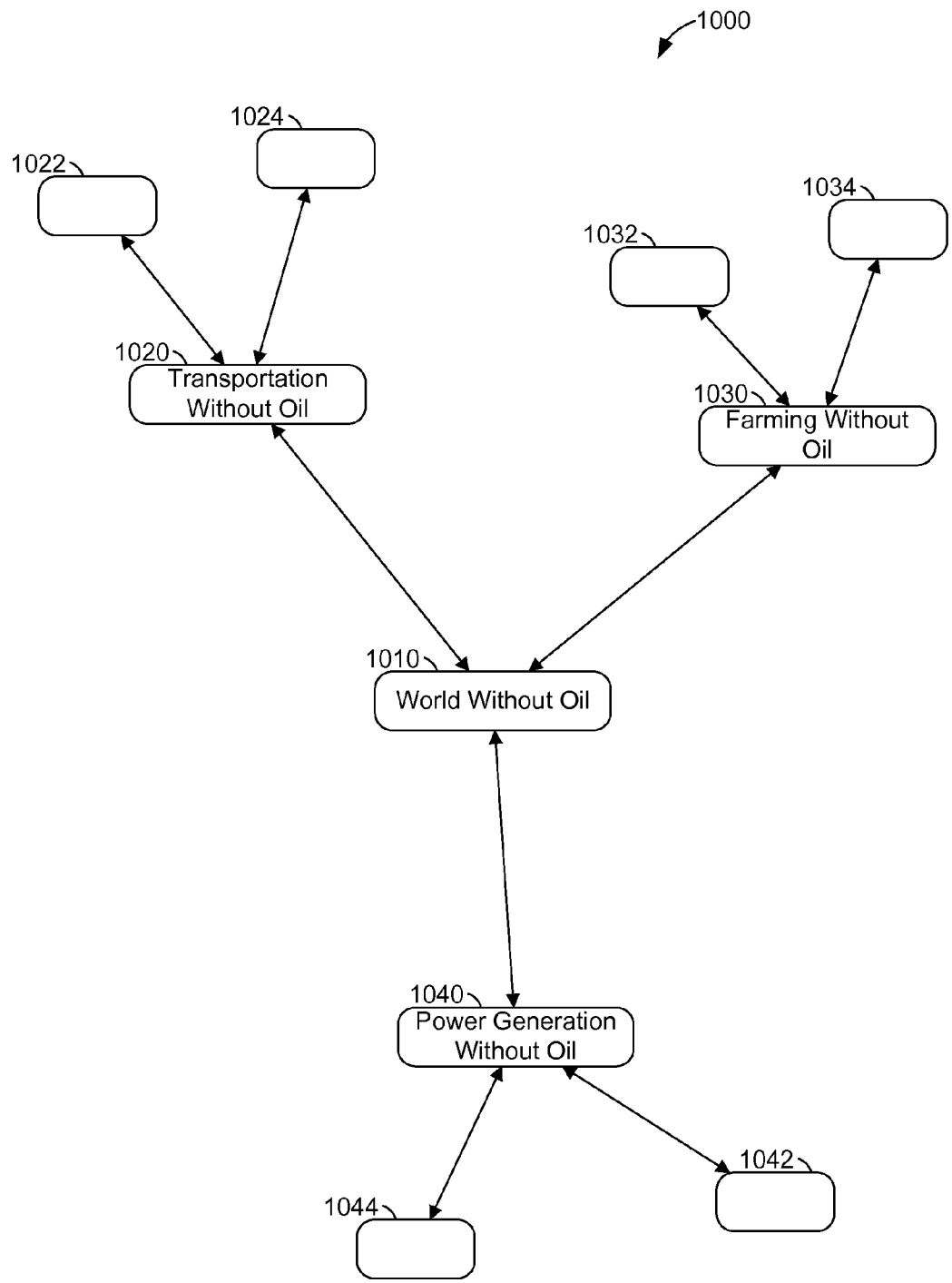
FIG. 10 is a diagram illustrating a graph of nodes, according to some example embodiments.

In operation 930, the data presentation module 230 (e.g., via the user interface module 232 or the publication module 234) generates a graph of nodes (e.g., an arrangement of multiple interconnected nodes that each represent one of the multiple subjects or topics, with the interconnected nodes being depicted in one or two or three dimensions within the graph of nodes). An example of such a graph of nodes is illustrated in FIG. 10. The graph of nodes may be generated based on some or all of the information described above with respect to operations 910 and 920. That is, the graph of nodes may be generated based on some or all of the multiple reports generated in operation 910, some or all of the multiple model investment portfolios and valuation charts generated in operation 920, or any suitable combination thereof.

Operation 932 may be performed as part of operation 930, in which the data presentation module 230 generates the graph of nodes. In operation 932, the data presentation module 230 (e.g., via the user interface module 232 or the publication module 234) generates the graph of nodes as a representation of a hypothetical common scenario described by the nodes. For example, the nodes within the graph may describe a "post-industrial world without oil" as the hypothetical common scenario, and such a graph of nodes may be generated based on multiple reports and multiple model investment portfolios that were generated based on a hypothesis that oil is unavailable in a post-industrial world.

Operation 934 may be performed as part of operation 932. In operation 932, the data presentation module 230 (e.g., via the user interface module 232 or the publication module 234) generates one of the nodes within the graph of nodes. This generated node may represent a hypothetical sub-scenario of the hypothetical scenario common to the graph of nodes. For example, supposing that the graph of nodes describes a post-industrial world without oil, the node generated in operation 934 may describe a portion of such a post-industrial world (e.g., "post-industrial transportation without oil," "post-industrial power generation without oil," or "farming without oil"). Accordingly, the graph of nodes may be generated as an aggregate of individual nodes that each represents a hypothetical sub-scenario of the hypothetical common scenario discussed above with respect to operation 932.

In operation 940, the data presentation module 230 (e.g., via the user interface module 232 or the publication module 234) generates an alert based on the augmented metadata (e.g., the second-phase metadata). For example, the alert may be an email, text message, a phone call, a voicemail, a pop-up notification, or any suitable combination thereof, and the alert may include some or all of the augmented metadata (e.g., for presentation to the user 132, via the device 130). In addition, the alert generated in operation 940 may be generated based on some or all of the graph of nodes generated in operation 930.

One or more of operations 944, 946, and 948 may be performed as part of operation 940, in which the data presentation module 230 generates an alert based on the augmented metadata (e.g., the second-phase metadata). In operation 944, the data presentation module 230 (e.g., via the user interface module 232 or the publication module 234) monitors the graph of nodes generated in operation 930. For example, the database 120 may store the graph of nodes, and the graph of nodes may be monitored (e.g., periodically or in real-time) for any nodes with a corresponding report, model investment portfolio, or valuation chart that corresponds to user-submitted alert criteria (e.g., received in a manner similar to that described above with respect to operation 722). In some example embodiments, the database 120 is monitored to detect a change or update in the graph of nodes.

In operation 946, the data presentation module 230 (e.g., via the user interface module 232 or the publication module 234) detects an occurrence of an event indicated by a user-submitted alert criteria. For example, performance of operation 450 may cause the data presentation module 230 to detect the event as a change or an update in the graph of nodes generated in operation 930 and stored within the database 120.

In operation 948, the data presentation module 230 (e.g., via the user interface module 232 or the publication module 234) generates the alert discussed above with respect to operation 940. This alert may be generated based on the event detected in operation 946. In some example embodiments, the generated alert is communicated by the data presentation module 230 to the user (e.g., user 132, via the device 130).

FIG. 10 is a diagram illustrates a graph 1000 of nodes, according to some example embodiments. The graph 1000 is a model of relationships between or among reports, investment portfolios, scenarios (e.g., actual or hypothetical scenarios or sub scenarios), or any suitable combination thereof. One or more of these reports may be generated based on the augmented metadata (e.g., the second-phase metadata), as described above with respect to operation 710. Similarly, one or more of these investment portfolios may be generated based on the augmented metadata (e.g., the second-phase metadata), as described above with respect to operation 820. The graph 1000 may be represented pictorially in a manner similar to that shown in FIG. 10. In some situations, the graph 1000 may be defined by a data structure that describes the relationships between the reports and investment portfolios modeled by the graph 1000. In the example shown in FIG. 10, nodes 1010, 1020, 1022, 1024, 1030, 1032, 1034, 1040, 1042, and 1044 are related to each other within the graph 1000 as represented by the indicated arrows.

According to various example embodiments, the node 1010 may represent a hypothetical scenario (e.g., "world without oil") described by the nodes 1020, 1030, and 1040 (e.g., as sub-nodes of the node 1010). Accordingly, the node 1020 may represent a hypothetical sub-scenario (e.g., "transportation without oil") described by one or more reports, investment portfolios (e.g., model investment portfolios or actual investment portfolios), scenarios (e.g., sub-sub-scenarios), or any suitable combination thereof, and the nodes 1022 and 1024 may represent one or more reports, investment portfolios, scenarios, or any suitable combination thereof, that describe the hypothetical sub-scenario represented by the node 1020. In a similar manner, the node 1030 may represent a hypothetical sub scenario (e.g., "farming without oil") described by one or more reports, investment portfolios, scenarios, or any suitable combination thereof, and the notes 1032 and 1034 may represent one or more reports, investment portfolios, scenarios, or any civil combination thereof, that describe the hypothetical sub-scenario represented by the node 1030. Likewise, the node 1040 may represent a hypothetical sub scenario (e.g., "power generation without oil") described by one or more reports, investment portfolios, scenarios, or any suitable combination thereof, and the notes 1042 and 1044 may represent one or more reports, investment portfolios, scenarios, or any civil combination thereof, that describe the hypothetical sub-scenario represented by the node 1040.

According to various example embodiments, one or more of the methodologies described herein may facilitate augmentation of data that is accessible from a data source. Moreover, one or more of the methodologies described herein may facilitate identification of correspondences and correlations between or among multiple data sources (e.g., in the form of links between or among data). Hence, one or more the methodologies described herein may facilitate retrieval and presentation of information regarding complex and sophisticated relationships among data, including relationships among financial investments and units thereof.

When these effects are considered in aggregate, one or more of the methodologies described herein may obviate a need for certain efforts or resources that otherwise would be involved in performing complex and sophisticated analyses of relationships among data, including analyses of financial investments. Efforts expended by a user in performing such analyses may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 11:
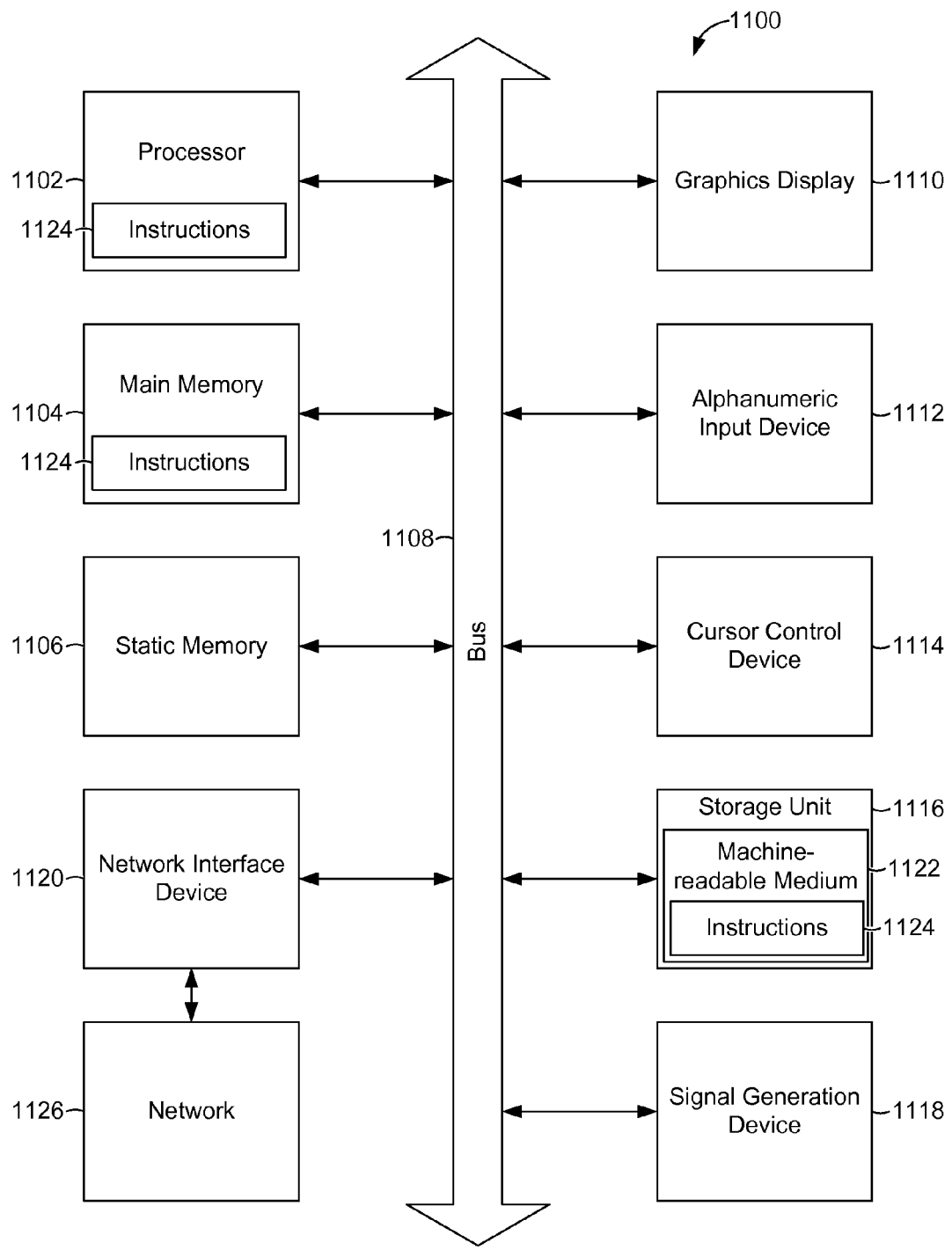
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein, in whole or in part. Specifically, FIG. 11 shows a diagrammatic representation of the machine 1100 in the example form of a computer system and within which instructions 1124 (e.g., software, a program, an application, an applet, an app, or other executable code) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods and systems (e.g., apparatus) discussed herein:

1. A method comprising:
accessing first data from a first data source;
extracting first-phase metadata of the first data from the first data and based on the first data source from which the first data is accessed;
creating a link from the first data to second data based on the first-phase metadata extracted from the first data and based on the first data source from which the first data is accessed, the creating of the link being performed by a processor of a machine;
determining second-phase metadata of the first data based on the created link from the first data to the second data; and
storing the second-phase metadata of the first data as augmented metadata of the first data.

2. The method of description 1, wherein:
the determining of the second-phase metadata includes accessing the second data based on the created link from the first data to the second data; and
the determining of the second-phase metadata of the first data is based on the accessed second data.

3. The method of description 1 or description 2, wherein:
the determining of the second-phase metadata includes accessing further metadata of the second data based on the created link from the first data to the second data; and
the determining of the second-phase metadata of the first data is based on the accessed further metadata.

4. The method of any of descriptions 1-3, wherein:
the first data has a data type;
the creating of the link from the first data to the second data includes accessing a template based on the data type of the first data; and
the creating of the link from the first data to the second data includes identifying the second data based on the template that is accessed based on the data type of the first data.

5. The method of description 4, wherein:
the data type of the first data is selected from a group consisting of a document, a webpage, a report, a publication, an article, a news feed, a message, an email, a voicemail, a video, an image, an audio file, a blog post, a micro-blog post, a forum comment, a server log, and sensor data.

6. The method of description 4 or description 5, wherein:
the template is selected from a group consisting of a glossary, a thesaurus, a list of person names, and a list of acronyms.

7. The method of any of descriptions 1-6, wherein:
the creating of the link from the first data to the second data includes identifying the second data by applying an NLP algorithm to the first data.

8. The method of any of descriptions 1-7, wherein:
the extracting of the first-phase metadata includes extracting from the first data at least one of a data type, an author name, a title, a date, a summary, a category, or a tag.

9. The method of any of descriptions 1-8, wherein:
the extracting of the first-phase metadata includes extracting from the first data source at least one of a publisher name, a provider name, a last refresh date, a next refresh date, an update frequency, or a permission indicator.

10. The method of any of descriptions 1-9, wherein:
the extracting of the first-phase metadata includes formatting the first-phase metadata into a format that is common to multiple data types within a data augmentation system.

11. The method of any of descriptions 1-10, wherein:
the storing of the second-phase metadata includes storing the second-phase metadata with the created link from the first data to the second data.

12. The method of any of descriptions 1-11, wherein:
the storing of the second-phase metadata includes storing the second-phase metadata with the extracted first-phase metadata of the first data.

13. The method of any of descriptions 1-12 further comprising:
initiating a web crawler configured to discover a location of the first data source from which the first data is to be accessed.

14. The method of any of descriptions 1-13 further comprising:
providing a communication generated based on the second-phase metadata stored as the augmented metadata of the first data, the communication being at least one of a report or an alert.

15. The method of any of descriptions 1-14 further comprising:
presenting a valuation chart of an investment portfolio generated based on the second-phase metadata stored as the augmented metadata of the first data.

16. The method of any of descriptions 1-15 further comprising:
generating a graph of nodes in which a node represents a scenario described by an investment portfolio generated based on the second-phase metadata stored as the augmented metadata of the first data.

17. A non-transitory machine-readable storage medium comprising
instructions that, when executed by one or more processors of a machine, cause the machine to perform operations comprising:
accessing first data from a first data source;
extracting first-phase metadata of the first data from the first data and based on the first data source from which the first data is accessed;
creating a link from the first data to second data based on the first-phase metadata extracted from the first data and based on the first data source from which the first data is accessed, the creating of the link being performed by the one or more processors of the machine;
determining second-phase metadata of the first data based on the created link from the first data to the second data; and
storing the second-phase metadata of the first data as augmented metadata of the first data.

18. The non-transitory machine-readable storage medium of description 17, wherein:
the determining of the second-phase metadata includes accessing further metadata of the second data based on the created link from the first data to the second data; and
the determining of the second-phase metadata of the first data is based on the accessed further metadata.

19. A system comprising:
a source access module configured to access first data from a first data source;
a metadata extraction module configured to extract first-phase metadata of the first data from the first data and based on the first data source from which the first data is accessed;
a processor configured by a template application module to create a link from the first data to second data based on the first-phase metadata extracted from the first data and based on the first data source from which the first data is accessed;
a metadata augmentation module configured to determine second-phase metadata of the first data based on the created link from the first data to the second data; and
a database configured to store the second-phase metadata of the first data as augmented metadata of the first data.

20. The system of description 19, wherein:
the determining of the second-phase metadata includes accessing further metadata of the second data based on the created link from the first data to the second data; and
the determining of the second-phase metadata of the first data is based on the accessed further metadata.

What is claimed is:
1. A computer-implemented method comprising:
accessing first data from a first data source accessible via a network;
extracting first-phase metadata of the first data, the first-phase metadata being extracted from the first data and from the first data source;
creating a link from the first data to second data available from a second data source, the link being created by application of a template to the extracted first-phase metadata of the first data, the application of the template including accessing a lookup table that corresponds to a data type of the first data and identifying the second data from the lookup table,
the creating of the link being performed by a processor of a machine;
determining second-phase metadata of the first data, the second-phase metadata being determined based on the created link from the first data to the second data by accessing the second data source; and
storing the second-phase metadata of the first data, the second-phase metadata being stored as augmented metadata of the first data.

2. The computer-implemented method of claim 1, wherein:
the determining of the second-phase metadata includes accessing the second data based on the created link from the first data to the second data; and
the determining of the second-phase metadata of the first data is based on the accessed second data.

3. The computer-implemented method of claim 1, wherein:
the determining of the second-phase metadata includes accessing further metadata of the second data based on the created link from the first data to the second data; and
the determining of the second-phase metadata of the first data is based on the accessed further metadata.

4. The computer-implemented method of claim 1, wherein:
the creating of the link from the first data to the second data includes accessing the template based on the data type of the first data.

5. The computer-implemented method of claim 4, wherein:
the data type of the first data is selected from a group consisting of a document, a webpage, a report, a publication, an article, a news feed, a message, an email, a voicemail, a video, an image, an audio file, a blog post, a micro-blog post, a forum comment, a server log, and sensor data.

6. The computer-implemented method of claim 4, wherein:
the template is selected from a group consisting of a glossary, a thesaurus, a list of person names, and a list of acronyms.

7. The computer-implemented method of claim 1, wherein:
the creating of the link from the first data to the second data includes identifying the second data by applying a natural language programming (NLP) algorithm to the first data.

8. The computer-implemented method of claim 1, wherein:
the extracting of the first-phase metadata includes extracting from the first data at least one of a data type, an author name, a title, a date, a summary, a category, or a tag.

9. The computer-implemented method of claim 1, wherein:
the extracting of the first-phase metadata includes extracting from the first data source at least one of a publisher name, a provider name, a last refresh date, a next refresh date, an update frequency, or a permission indicator.

10. The computer-implemented method of claim 1, wherein:
the extracting of the first-phase metadata includes formatting the first-phase metadata into a format that is common to multiple data types within a data augmentation system.

11. The computer-implemented method of claim 1, wherein:
the storing of the second-phase metadata includes storing the second-phase metadata with the created link from the first data to the second data.

12. The computer-implemented method of claim 1, wherein:
the storing of the second-phase metadata includes storing the second-phase metadata with the extracted first-phase metadata of the first data.

13. The computer-implemented method of claim 1 further comprising:
initiating a web crawler configured to discover a location of the first data source from which the first data is to be accessed.

14. The computer-implemented method of claim 1 further comprising:
providing a communication generated based on the second-phase metadata stored as the augmented metadata of the first data,
the communication being at least one of a report or an alert.

15. The computer-implemented method of claim 1 further comprising:
presenting a valuation chart of an investment portfolio generated based on the second-phase metadata stored as the augmented metadata of the first data.

16. The computer-implemented method of claim 1 further comprising:
generating a graph of nodes in which a node represents a scenario described by an investment portfolio generated based on the second-phase metadata stored as the augmented metadata of the first data.

17. A machine-readable storage medium comprising instructions that, when executed by one or more processors of a machine, cause the machine to perform operations comprising:

accessing first data from a first data source accessible via a network;
extracting first-phase metadata of the first data, the first-phase metadata being extracted from the first data and from the first data source;
creating a link from the first data to second data available from a second data source, the link being created by application of a template to the extracted first-phase metadata of the first data, the application of the template including accessing a lookup table that corresponds to a data type of the first data and identifying the second data from the lookup table,
the creating of the link being performed by the one or more processors of the machine;
determining second-phase metadata of the first data, the second-phase metadata being determined based on the created link from the first data to the second data by accessing the second data source; and
storing the second-phase metadata of the first data, the second-phase metadata being stored as augmented metadata of the first data.

18. The non-transitory machine-readable storage medium of claim 17, wherein:
the determining of the second-phase metadata includes accessing further metadata of the second data based on the created link from the first data to the second data; and
the determining of the second-phase metadata of the first data is based on the accessed further metadata.

19. A system comprising:
a source access module configured to access first data from a first data source accessible via a network;
a metadata extraction module configured to extract first-phase metadata of the first data, the first-phase metadata being extracted from the first data and from the first data source;
a processor configured by a template application module to create a link from the first data to second data available from a second data source, the link being created by application of a template to the extracted first-phase metadata of the first data, the application of the template including accessing a lookup table that corresponds to a data type of the first data and identifying the second data from the lookup table;
a metadata augmentation module configured to determine second-phase metadata of the first data, the second-phase metadata being determined based on the created link from the first data to the second data by accessing the second data source; and
a database configured to store the second-phase metadata of the first data, the second-phase metadata being stored as augmented metadata of the first data.

20. The system of claim 19, wherein:
the determining of the second-phase metadata includes accessing further metadata of the second data based on the created link from the first data to the second data; and
the determining of the second-phase metadata of the first data is based on the accessed further metadata.

* * * * *

UNITED STATES PATENT AND TRADEMARK OFFICE
CERTIFICATE OF CORRECTION

| | |
|---|---|
| PATENT NO. | : 8,799,278 B2 |
| APPLICATION NO. | : 13/632829 |
| DATED | : August 5, 2014 |
| INVENTOR(S) | : Blount et al. |

It is certified that error appears in the above-identified patent and that said Letters Patent is hereby corrected as shown below:

In the Specification

In column 4, line 6, delete "server" and insert --data augmentation--, therefor

In column 12, line 64, after "to", insert --operation--, therefor

Signed and Sealed this
Twenty-fifth Day of November, 2014

Michelle K. Lee
*Deputy Director of the United States Patent and Trademark Office*